United States Patent
Lin et al.

(10) Patent No.: US 11,290,711 B2
(45) Date of Patent: Mar. 29, 2022

(54) METHOD AND APPARATUS OF SHARED MERGE CANDIDATE LIST REGION FOR VIDEO CODING

(71) Applicant: MEDIATEK INC., Hsinchu (TW)

(72) Inventors: Yu-Cheng Lin, Hsinchu (TW);
Chen-Yen Lai, Hsinchu (TW);
Chun-Chia Chen, Hsinchu (TW);
Yu-Ling Hsiao, Hsinchu (TW);
Tzu-Der Chuang, Hsinchu (TW);
Ching-Yeh Chen, Hsinchu (TW);
Chih-Wei Hsu, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 17/282,361

(22) PCT Filed: Oct. 5, 2019

(86) PCT No.: PCT/CN2019/109835
§ 371 (c)(1),
(2) Date: Apr. 1, 2021

(87) PCT Pub. No.: WO2020/069673
PCT Pub. Date: Apr. 9, 2020

(65) Prior Publication Data
US 2021/0321089 A1    Oct. 14, 2021

Related U.S. Application Data

(60) Provisional application No. 62/819,702, filed on Mar. 18, 2019, provisional application No. 62/777,284, (Continued)

(51) Int. Cl.
*H04N 19/136* (2014.01)
*H04N 19/176* (2014.01)
(Continued)

(52) U.S. Cl.
CPC ......... *H04N 19/105* (2014.11); *H04N 19/136* (2014.11); *H04N 19/176* (2014.11); *H04N 19/96* (2014.11)

(58) Field of Classification Search
CPC .......................... H04N 19/105; H04N 19/136
See application file for complete search history.

(56) References Cited

U.S. PATENT DOCUMENTS 9,621,903 B2 * 4/2017 Kim ..................... H04N 19/159
9,736,489 B2 * 8/2017 Wang ................... H04N 19/105
(Continued)

FOREIGN PATENT DOCUMENTS

CN     103797799 A     5/2014
CN     104185988 A     12/2014
(Continued)

OTHER PUBLICATIONS

International Search Report and Written Opinion dated Jan. 9, 2020, issued in application No. PCT/CN2019/109835.
(Continued)

*Primary Examiner* — Irfan Habib
(74) *Attorney, Agent, or Firm* — McClure, Qualey & Rodack, LLP

(57) ABSTRACT

A method and apparatus of video coding using history-based candidate derivation are disclosed. According to one method, a current block is inside a Shared Merge candidate list Region (SMR) or a history-based parallel processing region is received. The current block is encoded or decoded using a Merge candidate list. Only if the current block is one of first-coded N (N≥0) blocks, one of last-coded N blocks, or one of selected N blocks, the history-based candidate list is updated after the current block is encoded or decoded. In one embodiment, Merge candidate list is pre-generated for the current block in the SMR and is separately generated for (Continued)

the current block in the history-based parallel processing region. In another method, if the current block is inside the SMR or the history-based parallel processing region, the current block is encoded or decoded using a history-based candidate list associated with the root CU.

9 Claims, 11 Drawing Sheets

Related U.S. Application Data filed on Dec. 10, 2018, provisional application No. 62/742,280, filed on Oct. 6, 2018.

(51) Int. Cl.
*H04N 19/105* (2014.01)
*H04N 19/96* (2014.01)

(56) References Cited

U.S. PATENT DOCUMENTS

| | | | |
|---|---|---|---|
| 10,491,902 B1* | 11/2019 | Xu | H04N 19/105 |
| 10,652,551 B2 | 5/2020 | Jeon et al. | |
| 10,743,016 B2* | 8/2020 | Lai | H04N 19/43 |
| 10,863,181 B2 | 12/2020 | Kim et al. | |
| 2011/0200107 A1* | 8/2011 | Ryu | H04N 19/162 |
| | | | 375/240.16 |
| 2016/0373739 A1 | 12/2016 | Holcomb et al. | |
| 2017/0078673 A1* | 3/2017 | Kim | H04N 19/117 |
| 2019/0068978 A1* | 2/2019 | Jeon | H04N 19/52 |
| 2020/0007889 A1* | 1/2020 | Chao | H04N 19/593 |
| 2020/0059658 A1* | 2/2020 | Chien | H04N 19/52 |

FOREIGN PATENT DOCUMENTS

| | | |
|---|---|---|
| CN | 107257476 A | 10/2017 |
| EP | 2 806 636 A1 | 11/2014 |

OTHER PUBLICATIONS

Bross, B , et al.; "Versatile Video Coding (Draft 4);" Joint Video Experts Team (JVET) of ITU-T SG 16 WP 3 and ISO/IEC JTC 1/SC 29/WG 11; Jan. 2019; pp. 1-299.

Chen, C.C., et al.; "CE4-related: Shared merge list;" Joint Video Experts Team (JVET) of ITU-T SG 16 WP 3 and ISO/IEC JTC 1/SC 29/WG 11; Oct. 2018; pp. 1-157.

Wang, S., et al. "CE4-related: Simplification for share merge list and HMVP harmonization process;" Joint Video Experts Team (JVET) of ITU-T SG 16 WP 3 and ISO/IEC JTC 1/SC 29/WG 11; Mar. 2019; pp. 1-21.

Chinese language office action dated Feb. 8, 2021, issued in application No. TW 108136228.

\* cited by examiner

METHOD AND APPARATUS OF SHARED MERGE CANDIDATE LIST REGION FOR VIDEO CODING

CROSS REFERENCE TO RELATED APPLICATIONS

The present invention claims priority to U.S. Provisional Patent Application, Ser. No. 62/742,280, filed on Oct. 6, 2018, U.S. Provisional Patent Application, Ser. No. 62/777,284, filed on Dec. 10, 2018 and U.S. Provisional Patent Application, Ser. No. 62/819,702 filed on Mar. 18, 2019. The U.S. Provisional patent applications are hereby incorporated by reference in their entireties.

FIELD OF THE INVENTION

The present invention relates to video coding using Merge mode and history-based Merge candidate construction. In particular, the present invention discloses techniques to overcome dependency issues associated with history-based candidate list handling for Shared Merge candidate list Region (SMR) or a parallel processing region such as Merge Estimation Region (MER).

BACKGROUND AND RELATED ART

The High Efficiency Video Coding (HEVC) standard is developed under the joint video project of the ITU-T Video Coding Experts Group (VCEG) and the ISO/IEC Moving Picture Experts Group (MPEG) standardization organizations, and is especially with partnership known as the Joint Collaborative Team on Video Coding (JCT-VC). In HEVC, one slice is partitioned into multiple coding tree units (CTU). In main profile, the minimum and the maximum sizes of CTU are specified by the syntax elements in the sequence parameter set (SPS). The allowed CTU size can be 8×8, 16×16, 32×32, or 64×64. For each slice, the CTUs within the slice are processed according to a raster scan order.

The CTU is further partitioned into multiple coding units (CU) to adapt to various local characteristics. A quadtree, denoted as the coding tree, is used to partition the CTU into multiple CUs. Let CTU size be M×M, where M is one of the values of 64, 32, or 16. The CTU can be a single CU (i.e., no splitting) or can be split into four smaller units of equal sizes (i.e., M/2×M/2 each), which correspond to the nodes of the coding tree. If units are leaf nodes of the coding tree, the units become CUs. Otherwise, the quadtree splitting process can be iterated until the size for a node reaches a minimum allowed CU size as specified in the SPS (Sequence Parameter Set). This representation results in a recursive structure as specified by a coding tree (also referred to as a partition tree structure) 120 in FIG. 1. The CTU partition 110 is shown in FIG. 1, where the solid lines indicate CU boundaries. The decision whether to code a picture area using Inter-picture (temporal) or Intra-picture (spatial) prediction is made at the CU level. Since the minimum CU size can be 8×8, the minimum granularity for switching between different basic prediction types is 8×8.

Furthermore, according to HEVC, each CU can be partitioned into one or more prediction units (PU). Coupled with the CU, the PU works as a basic representative block for sharing the prediction information. Inside each PU, the same prediction process is applied and the relevant information is transmitted to the decoder on a PU basis. A CU can be split into one, two or four PUs according to the PU splitting type. HEVC defines eight shapes for splitting a CU into PU as shown in FIG. 2, including M×M, M×M/2, M/2×M, M/2×M/2, M×M/4 (U), M×M/4 (D), M/4×M (L) and M/4×M (R) partition types. Unlike the CU, the PU may only be split once according to HEVC. The partitions shown in the second row correspond to asymmetric partitions, where the two partitioned parts have different sizes.

After obtaining the residual block by the prediction process based on PU splitting type, the prediction residues of a CU can be partitioned into transform units (TU) according to another quadtree structure which is analogous to the coding tree for the CU as shown in FIG. 1. The solid lines indicate CU boundaries and dotted lines indicate TU boundaries. The TU is a basic representative block having residual or transform coefficients for applying the integer transform and quantization. For each TU, one integer transform having the same size to the TU is applied to obtain residual coefficients. These coefficients are transmitted to the decoder after quantization on a TU basis.

The terms coding tree block (CTB), coding block (CB), prediction block (PB), and transform block (TB) are defined to specify the 2-D sample array of one colour component associated with CTU, CU, PU, and TU, respectively. Thus, a CTU consists of one luma CTB, two chroma CTBs, and associated syntax elements. A similar relationship is valid for CU, PU, and TU. The tree partitioning is generally applied simultaneously to both luma and chroma, although exceptions apply when certain minimum sizes are reached for chroma.

Alternatively, a binary tree block partitioning structure is proposed in JCTVC-P1005 (D. Flynn, et al, "HEVC Range Extensions Draft 6", Joint Collaborative Team on Video Coding (JCT-VC) of ITU-T SG 16 WP 3 and ISO/IEC JTC 1/SC 29/WG 11, 16th Meeting: San Jose, US, 9-17 Jan. 2014, Document: JCTVC-P1005). In the proposed binary tree partitioning structure, a block can be recursively split into two smaller blocks using various binary splitting types (i.e., M/2×M, M×M/2, M/4×M (L), M/4×M (R), M×M/4 (U) and M×M/4 (D)) as shown in FIG. 3. The most efficient and simplest ones are the symmetric horizontal and vertical split as shown in the top two splitting types in FIG. 3. For a given block of size M×M, a flag is signalled to indicate whether the given block is split into two smaller blocks. If yes, another syntax element is signalled to indicate which splitting type is used. If the horizontal splitting is used, the given block is split into two blocks of size M×M/2. If the vertical splitting is used, the given block is split into two blocks of size M/2×M. The binary tree splitting process can be iterated until the size (width or height) for a splitting block reaches a minimum allowed block size (width or height). The minimum allowed block size can be defined in high level syntax such as SPS. Since the binary tree has two splitting types (i.e., horizontal and vertical), the minimum allowed block width and height should be both indicated. Non-horizontal splitting is implicitly implied when splitting would result in a block height smaller than the indicated minimum. Non-vertical splitting is implicitly implied when splitting would result in a block width smaller than the indicated minimum. FIG. 4 illustrates an example of block partitioning 410 and its corresponding binary tree 420. In each splitting node (i.e., non-leaf node) of the binary tree, one flag is used to indicate which splitting type (horizontal or vertical) is used, where 0 may indicate horizontal splitting and 1 may indicate vertical splitting.

The binary tree structure can be used for partitioning an image area into multiple smaller blocks such as partitioning a slice into CTUs, a CTU into CUs, a CU into PUs, or a CU into TUs, and so on. The binary tree can be used for partitioning a CTU into CUs, where the root node of the binary tree is a CTU and the leaf node of the binary tree is CU. The leaf nodes can be further processed by prediction and transform coding. For simplification, there is no further partitioning from CU to PU or from CU to TU, which means CU equal to PU and PU equal to TU. Therefore, in other words, the leaf node of the binary tree is the basic unit for prediction and transforms coding.

QTBT Structure

Binary tree structure is more flexible than quadtree structure since more partition shapes can be supported, which is also the source of coding efficiency improvement. However, the encoding complexity will also increase in order to select the best partition shape. In order to balance the complexity and coding efficiency, a method to combine the quadtree and binary tree structure, which is also called as quadtree plus binary tree (QTBT) structure, has been disclosed. According to the QTBT structure, a CTU (or CTB for I slice) is the root node of a quadtree and the CTU is firstly partitioned by a quadtree, where the quadtree splitting of one node can be iterated until the node reaches the minimum allowed quadtree leaf node size (i.e., MinQTSize). If the quadtree leaf node size is not larger than the maximum allowed binary tree root node size (i.e., MaxBTSize), it can be further partitioned by a binary tree. The binary tree splitting of one node can be iterated until the node reaches the minimum allowed binary tree leaf node size (i.e., MinBTSize) or the maximum allowed binary tree depth (i.e., MaxBTDepth). The binary tree leaf node, namely CU (or CB for I slice), will be used for prediction (e.g. Intra-picture or inter-picture prediction) and transform without any further partitioning. There are two splitting types in the binary tree splitting: symmetric horizontal splitting and symmetric vertical splitting. In the QTBT structure, the minimum allowed quadtree leaf node size, the maximum allowed binary tree root node size, the minimum allowed binary tree leaf node width and height, and the maximum allowed binary tree depth can be indicated in the high level syntax such as in SPS. FIG. 5 illustrates an example of block partitioning 510 and its corresponding QTBT 520. The solid lines indicate quadtree splitting and dotted lines indicate binary tree splitting. In each splitting node (i.e., non-leaf node) of the binary tree, one flag indicates which splitting type (horizontal or vertical) is used, 0 may indicate horizontal splitting and 1 may indicate vertical splitting.

The above QTBT structure can be used for partitioning an image area (e.g. a slice, CTU or CU) into multiple smaller blocks such as partitioning a slice into CTUs, a CTU into CUs, a CU into PUs, or a CU into TUs, and so on. For example, the QTBT can be used for partitioning a CTU into CUs, where the root node of the QTBT is a CTU which is partitioned into multiple CUs by a QTBT structure and the CUs are further processed by prediction and transform coding. For simplification, there is no further partitioning from CU to PU or from CU to TU. That means CU equal to PU and PU equal to TU. Therefore, in other words, the leaf node of the QTBT structure is the basic unit for prediction and transform.

An example of QTBT structure is shown as follows. For a CTU with size 128×128, the minimum allowed quadtree leaf node size is set to 16×16, the maximum allowed binary tree root node size is set to 64×64, the minimum allowed binary tree leaf node width and height both is set to 4, and the maximum allowed binary tree depth is set to 4. Firstly, the CTU is partitioned by a quadtree structure and the leaf quadtree unit may have size from 16×16 (i.e., minimum allowed quadtree leaf node size) to 128×128 (equal to CTU size, i.e., no split). If the leaf quadtree unit is 128×128, it cannot be further split by binary tree since the size exceeds the maximum allowed binary tree root node size 64×64. Otherwise, the leaf quadtree unit can be further split by binary tree. The leaf quadtree unit, which is also the root binary tree unit, has binary tree depth as 0. When the binary tree depth reaches 4 (i.e., the maximum allowed binary tree as indicated), no splitting is implicitly implied. When the block of a corresponding binary tree node has width equal to 4, non-horizontal splitting is implicitly implied. When the block of a corresponding binary tree node has height equal to 4, non-vertical splitting is implicitly implied. The leaf nodes of the QTBT are further processed by prediction (Intra picture or Inter picture) and transform coding.

For I-slice, the QTBT tree structure usually applied with the luma/chroma separate coding. For example, the QTBT tree structure is applied separately to luma and chroma components for I-slice, and applied simultaneously to both luma and chroma (except when certain minimum sizes being reached for chroma) for P- and B-slices. In other words, in an I-slice, the luma CTB has its QTBT-structured block partitioning and the two chroma CTBs have another QTBT-structured block partitioning. In another example, the two chroma CTBs can also have their own QTBT-structured block partitions.

To further support more partition shapes to achieve more flexible partitioning, triple tree partitioning method is designed to capture objects which locate in the block centre while quad-tree and binary tree partitioning methods always split along the block centre. FIG. 6A illustrates vertical triple tree partitioning 610 and horizontal triple tree partitioning 620. The triple tree partitioning method may provide capability to faster localize small object along block boundaries, by allowing one-quarter partitioning vertically or horizontally.

Multi-Type-Tree (MTT) block partitioning extends the concept of the two-level tree structure in QTBT by allowing both the binary tree and triple tree partitioning methods in the second level of MTT. The two levels of trees in MTT are called region tree (RT) and prediction tree (PT) respectively. The first level RT is always quad-tree (QT) partitioning, and the second level PT may be either binary tree (BT) partitioning or triple tree (TT) partitioning. For example, a CTU is firstly partitioned by RT, which is QT partitioning, and each RT leaf node may be further split by PT, which is either BT or TT partitioning. A block partitioned by PT may be further split with PT until a maximum PT depth is reached. For example, a block may be first partitioned by vertical BT partitioning to generate a left sub-block and a right sub-block, and the left sub-block is further split by horizontal TT partitioning while the right sub-block is further split by horizontal BT partitioning. A PT leaf node is the basic Coding Unit (CU) for prediction and transform and will not be further split.

FIG. 6B illustrates an example of tree-type signalling for block partitioning according to MTT block partitioning. RT signalling may be similar to the quad-tree signalling in QTBT block partitioning. For signalling a PT node, one additional bin is signalled to indicate whether it is a binary tree partitioning or triple tree partitioning. For a block split by RT, a first bin is signalled to indicate whether there is another RT split, if the block is not further split by RT (i.e. the first bin is 0), a second bin is signalled to indicate whether there is a PT split. If the block is also not further split by PT (i.e. the second bin is 0), then this block is a leaf node. If the block is then split by PT (i.e. the second bin is 1), a third bin is sent to indicate horizontal or vertical partitioning followed by a fourth bin for distinguishing binary tree (BT) or triple tree (TT) partitioning.

After constructing the MTT block partition, MTT leaf nodes are CUs, which are used for prediction and transform without any further partitioning. In MTT, the proposed tree structure is coded separately for luma and chroma in I slice, and applied simultaneously to both luma and chroma (except when certain minimum sizes are reached for chroma) in P and B slice. That is to say that, in I slice, the luma CTB has its QTBT-structured block partitioning, and the two chroma CTBs has another QTBT-structured block partitioning.

While the proposed MTT is able to improve performance by adaptively partitioning blocks for prediction and transform, it is desirable to further improve the performance whenever possible in order to achieve an overall efficiency target.

Merge Mode and AMVP Mode

To increase the coding efficiency of motion vector (MV) coding in HEVC, HEVC has the Skip, Merge mode and Inter Advanced Motion Vector Prediction (AMVP) modes. Skip and Merge modes obtains the motion information from spatially neighbouring blocks (spatial candidates) or a temporal co-located block (temporal candidate) as shown in FIG. 7. When a PU is Skip or Merge mode, no motion information is coded, instead, only the index of the selected candidate is coded. For Skip mode, the residual signal is forced to be zero and not coded. In HEVC, if a particular block is encoded as Skip or Merge, a candidate index is signalled to indicate which candidate among the candidate set is used for merging. Each merged PU reuses the MV, prediction direction, and reference picture index of the selected candidate.

For Merge mode in HM-4.0 (HEVC Test Model 4.0) in HEVC, as shown in FIG. 7, up to four spatial MV candidates are derived from $A_0$, $A_1$, $B_0$ and $B_1$, and one temporal MV candidate is derived from $T_{BR}$ or $T_{CTR}$ ($T_{CTR}$ is used first, if $T_{BR}$ is not available, $T_{CTR}$ is used instead). Note that if any of the four spatial MV candidates is not available, the position $B_2$ is then used to derive MV candidate as a replacement. After the derivation process of the four spatial MV candidates and one temporal MV candidate, removing redundancy (pruning) is applied to remove redundant MV candidates. If after removing redundancy (pruning), the number of available MV candidates is smaller than five, three types of additional candidates are derived and are added to the candidate set (candidate list). The encoder selects one final candidate within the candidate set for Skip, or Merge modes based on the rate-distortion optimization (RDO) decision, and transmits the index to the decoder.

In this disclosure, the Skip and Merge mode are denoted as "Merge mode".

FIG. 7 also shows the neighbouring PUs used to derive the spatial and temporal MVPs for both AMVP and Merge scheme. In AMVP, the left MVP is the first available one from $A_0$, $A_1$, the top MVP is the first available one from $B_0$, $B_1$, $B_2$, and the temporal MVP is the first available one from $T_{BR}$ or $T_{CTR}$ ($T_{BR}$ is used first, if $T_{BR}$ is not available, $T_{CTR}$ is used instead). If the left MVP is not available and the top MVP is not scaled MVP, the second top MVP can be derived if there is a scaled MVP among $B_0$, $B_1$, and $B_2$. The list size of MVPs of AMVP is 2 in HEVC. Therefore, after the derivation process of the two spatial MVPs and one temporal MVP, only the first two MVPs can be included in the MVP list. If after removing redundancy, the number of available MVPs is less than two, zero vector candidates are added to the candidates list.

When a PU is coded in Inter AMVP mode, motion-compensated prediction is performed with transmitted motion vector differences (MVDs) that can be used together with Motion Vector Predictors (MVPs) for deriving motion vectors (MVs). To decide MVP in Inter AMVP mode, the advanced motion vector prediction (AMVP) scheme is used to select a motion vector predictor among an AMVP candidate set including two spatial MVPs and one temporal MVP. So, in AMVP mode, MVP index for MVP and the corresponding MVDs are required to be encoded and transmitted. In addition, the Inter prediction direction to specify the prediction directions among bi-prediction, and uni-prediction which are list 0 (i.e., L0) and list 1 (i.e., L1), accompanied with the reference frame index for each list should also be encoded and transmitted.

FIG. 7 shows the neighbouring PUs referred to derive the spatial and temporal MVPs for both AMVP and Merge scheme. In AMVP, the left MVP is the first available one from $A_0$, $A_1$, the top MVP is the first available one from $B_0$, $B_1$, Ba, and the temporal MVP is the first available one from $T_{BR}$ or $T_{CTR}$ ($T_{BR}$ is used first, if $T_{BR}$ is not available, $T_{CTR}$ is used instead). If the left MVP is not available and the top MVP is not scaled MVP, the second top MVP can be derived if there is a scaled MVP among $B_0$, $B_1$, and $B_2$. The list size of MVPs of AMVP is 2 in HEVC. Therefore, after the derivation process of the two spatial MVPs and one temporal MVP, only the first two MVPs can be included in the MVP list. If after removing redundancy, the number of available MVPs is less than two, zero vector candidates are added to the candidates list.

For Skip and Merge mode, up to four spatial Merge index are derived from $A_0$, $A_1$, $B_0$ and $B_1$, and one temporal Merge index is derived from $T_{BR}$ or $T_{CTR}$ ($T_{BR}$ is used first, if $T_{BR}$ is not available, $T_{CTR}$ is used instead) as shown in FIG. 7. Note that if any of the four spatial Merge index is not available, the position $B_2$ is then used to derive Merge index as a replacement. After the derivation process of the four spatial Merge index and one temporal Merge index, removing redundancy is applied to remove redundant Merge index. If after removing redundancy, the number of available Merge index is smaller than five, three types of additional candidates are derived and are added to the candidates list. The encoder selects one final candidate within the candidate set for Skip, or Merge modes based on the rate-distortion optimization (RDO) decision, and transmits the index to the decoder.

Additional bi-predictive Merge candidates are created by using original Merge candidates. The additional candidates are divided into three candidate types:
1. Combined bi-predictive Merge candidate (candidate type 1)
2. Scaled bi-predictive Merge candidate (candidate type 2)
3. Zero vector Merge/AMVP candidate (candidate type 3)

In candidate type 1, combined bi-predictive Merge candidates are created by combining original Merge candidate. In particular, two candidates in original candidates, which have mvL0 (the motion vector in list 0) and refIdxL0 (the reference picture index in list 0) or mvL1 (the motion vector in list 1) and refIdxL1 (the reference picture index in list 1), are used to created bi-predictive Merge candidates. FIG. 8 illustrates an example of the derivation process for combined bi-predictive Merge candidate. The candidate set 810 corresponds to an original candidate list, which includes mvL0_A, ref0 (831) in L0 and mvL1_B, ref0 (832) in L1.

A bi-prediction MVP 833 can be formed by combining the candidates in L0 and L1 as indicated by the process 830 in FIG. 8.

In candidate type 2, scaled bi-predictive Merge candidates are created by scaling original Merge candidate. In particular, one candidate in original candidates, which have mvLX (the motion vector in list X) and refIdxLX (the reference picture index in list X), X can be 0 or 1, is used to created bi-predictive Merge candidates. For example, one candidate A is list 0 uni-predictive with mvL0_A and ref0, ref0 is firstly copied to reference index ref0' in list 1. After that, mvL0'_A is calculated by scaling mvL0_A with ref0 and ref0'. Then, bi-predictive Merge candidate which has mvL0_A and ref0 in list 0 and mvL0' A and ref0' in list 1, is created and added into Merge candidate list. An example of the derivation process of the scaled bi-predictive Merge candidate is shown in FIG. 9A, where candidate list 910 corresponds to an original candidate list and candidate list 920 corresponds to the expanded candidate list including two generated bi-prediction MVPs as illustrated by process 930.

In candidate type 3, Zero vector Merge/AMVP candidates are created by combining zero vectors and reference index, which can be referred. FIG. 9B illustrates an example for adding zero vector Merge candidates, where candidate list 940 corresponds to an original Merge candidate list and candidate list 950 corresponds to the extended Merge candidate list by adding zero candidates. FIG. 9C illustrates an example for adding zero vector AMVP candidates, where candidate lists 960 (L0) and 962 (L1) correspond to original AMVP candidate lists and the candidate list 970 (L0) and 972 (L1) correspond to the extended AMVP candidate lists by adding zero candidates. If zero vector candidates are not duplicated, it is added to Merge/AMVP candidates list.

Conventional Sub-PU Temporal Motion Vector Prediction (SbTMVP)

The ATMVP (Advanced Temporal Motion Vector Prediction) mode (or also called as Sub-PU Temporal Motion Vector Prediction (SbTMVP)) is a Sub-PU based mode for Merge candidate, it uses a spatial neighbour to get an initial vector, and the initial vector (to be modified in some embodiments) is used to get the coordinate of the collocated block on the collocated picture. Then, the sub-CU (usually 4×4 or 8×8) motion information of the collocated block on the collocated picture are then retrieved and filled into sub-CU (usually 4×4 or 8×8) motion buffer of the current Merge candidate. There are several variations of the ATMVP as disclosed in JVET-C1001 (J. Chen, et al., "Algorithm Description of Joint Exploration Test Model 3 (JEM3)", Joint Video Exploration Team (JVET) of ITU-T SG 16 WP 3 and ISO/IEC JTC 1/SC 29/WG 11: 3rd Meeting: Geneva, CH, 26 May-1 Jun. 2016, Document: JVET-C1001) and JVET-K0346 (X. Xiu, et al., "CE4-related: One simplified design of advanced temporal motion vector prediction (ATMVP)", Joint Video Experts Team (JVET) of ITU-T SG 16 WP 3 and ISO/IEC JTC 1/SC 29/WG 11, 11th Meeting: Ljubljana, SI, 10-18 Jul. 2018, Document: JVET-K0346).

Spatial-Temporal Motion Vector Prediction (STMVP)

The STMVP mode is a Sub-PU based mode for Merge candidate. The motion vectors of the sub-PUs are generated recursively in raster scan order. The derivation of MV for current sub-PU firstly identifying its two spatial neighbours. One temporal neighbour is then derived using some MV scaling. After retrieving and scaling the MVs, all available motion vectors (up to 3) are averaged to form an STMVP, which is assigned as the motion vector of the current sub-PU. Detailed descript of STMVP can be found in section 2.3.1.2 of JVET-C1001.

History-Based Merge Mode

The History Based Merge Mode is a variation of conventional Merge mode. The History Based Merge Mode stores Merge candidates of some previous CUs in a history array. Therefore, the current CU can use one or more candidates inside the history array, besides the original Merge candidate, to enrich the Merge mode candidates. Details of the History Based Merge Mode can be found in JVET-K0104 (L. Zhang, et al., "CE4-related: History-based Motion Vector Prediction", Joint Video Experts Team (JVET) of ITU-T SG 16 WP 3 and ISO/IEC JTC 1/SC 29/WG 11, 11th Meeting: Ljubljana, SI, 10-18 Jul. 2018, Document: JVET-K0104).

The history-based method can also be applied to AMVP candidate list.

Non-Adjacent Merge Candidate

The non-adjacent Merge candidates uses some spatial candidates far away from the current CU. Variations of the non-adjacent Merge candidates can be found in JVET-K0228 (R. Yu, et al., "CE4-2.1: Adding non-adjacent spatial merge candidates", Joint Video Experts Team (JVET) of ITU-T SG 16 WP 3 and ISO/IEC JTC 1/SC 29/WG 11, 11th Meeting: Ljubljana, SI, 10-18 Jul. 2018, Document: JVET-K0104) and JVET-K0286 (J. Ye, et al., "CE4: Additional merge candidates (Test 4.2.13)", Joint Video Experts Team (JVET) of ITU-T SG 16 WP 3 and ISO/IEC JTC 1/SC 29/WG 11, 11th Meeting: Ljubljana, SI, 10-18 Jul. 2018, Document: JVET-K0104).

The non-adjacent-based method can also be applied to AMVP candidate list.

Affine Mode

In contribution ITU-T13-SG16-C1016 submitted to ITU-VCEG (Lin, et al., "Affine transform prediction for next generation video coding", ITU-U, Study Group 16, Question Q6/16, Contribution C1016, September 2015, Geneva, CH), a four-parameter affine prediction is disclosed, which includes the affine Merge mode. When an affine motion block is moving, the motion vector field of the block can be described by two control point motion vectors or four parameters as follows, where (vx, vy) represents the motion vector $$\begin{cases} x' = ax + by + e \\ y' = -bx + ay + f \\ vx = x - x' \\ vy = y - y' \end{cases} \overset{\Delta}{\Rightarrow} \begin{cases} vx = (1-a)x - by - e \\ vy = (1-a)y + bx - f \end{cases} \quad (1)$$

An example of the four-parameter affine model is shown in FIG. 10, where block 1010 corresponds to the current block and block 1020 corresponds to the reference block. The transformed block is a rectangular block. The motion vector field of each point in this moving block can be described by the following equation:

$$\begin{cases} v_x = \dfrac{(v_{1x} - v_{0x})}{w}x - \dfrac{(v_{1y} - v_{0y})}{w}y + v_{0x} \\ v_y = \dfrac{(v_{1y} - v_{0y})}{w}x + \dfrac{(v_{1x} - v_{0x})}{w}y + v_{0y} \end{cases} \quad (2)$$

In the above equations, ($v_{0x}$, $v_{0y}$) is the control-point motion vector (i.e., $v_0$) at the upper-left corner of the block, and ($v_{1x}$, $v_{1y}$) is another control-point motion vector (i.e., $v_1$) at the upper-right corner of the block. When the MVs of two control points are decoded, the MV of each 4×4 block of the block can be determined according to the above equation. In other words, the affine motion model for the block can be specified by the two motion vectors at the two control points. Furthermore, while the upper-left corner and the upper-right corner of the block are used as the two control points, other two control points may also be used.

There are two kinds of affine candidate: Inherited affine candidate and Corner derived candidate (i.e., constructed candidate). For the inherited affine candidate, the current block inherits the affine model of a neighbouring block. All control-point MVs are from the same neighbouring block. If the current block 1110 inherits the affine motion from block A1, the control-point MVs of block A1 are used as the control-point MVs of the current block as shown in FIG. 11A, where the block 1112 associated with block A1 is rotated to block 1114 based on the two control-point MVs ($v_0$ and $v_1$). Accordingly, the current block 1110 is rotated to block 1116. The inherited candidates are inserted before the corner derived candidates. The order to select a candidate for inheriting the control-point MVs is according to: (A0→A1) (B0→B1→B2).

In contribution ITU-T13-SG16-C1016, for an Inter mode coded CU, an affine flag is signalled to indicate whether the affine Inter mode is applied or not when the CU size is equal to or larger than 16×16. If the current block (e.g., current CU) is coded in affine Inter mode, a candidate MVP pair list is built using the neighbour valid reconstructed blocks. FIG. 11B illustrates the neighbouring block set used for deriving the corner-derived affine candidate. As shown in FIG. 11B, $\vec{v}_0$ corresponds to a motion vector of the block V0 at the upper-left corner of the current block 1120, which is selected from the motion vectors of the neighbouring block a0 (referred as the above-left block), a1 (referred as the inner above-left block) and a2 (referred as the lower above-left block). The $\vec{v}_1$ corresponds to motion vector of the block V1 at the upper-right corner of the current block 1120, which is selected from the motion vectors of the neighbouring block b0 (referred as the above block) and b1 (referred as the above-right block).

In the above equation, MVa is the motion vector associated with the blocks a0, a1 or a2, MVb is selected from the motion vectors of the blocks b0 and b1 and MVc is selected from the motion vectors of the blocks c0 and c1. The MVa and MVb that have the smallest DV are selected to form the MVP pair. Accordingly, while only two MV sets (i.e., MVa and MVb) are to be searched for the smallest DV, the third DV set (i.e., MVc) is also involved in the selection process. The third DV set corresponds to motion vector of the block at the lower-left corner of the current block 1110, which is selected from the motion vectors of the neighbouring block c0 (referred as the left block) and c1 (referred as the left-bottom block). In the example of FIG. 11B, the neighbouring blocks (a0, a1, a2, b0, b1, b2, c0 and c1) used to construct the control-point MVs for affine motion model are referred as a neighbouring block set in this disclosure.

In ITU-T13-SG16-C-1016, an affine Merge mode is also proposed. If current is a Merge PU, the neighbouring five blocks (c0, b0, b1, c1, and a0 blocks in FIG. 11B) are checked to determine whether one of them is affine Inter mode or affine Merge mode. If yes, an affine_flag is signalled to indicate whether the current PU is affine mode. When the current PU is coded in affine Merge mode, it gets the first block coded with affine mode from the valid neighbour reconstructed blocks. The selection order for the candidate block is from left, above, above-right, left-bottom to above-left (i.e., c0→b0→b1→c1→a0) as shown in FIG. 11B. The affine parameter of the first affine coded block is used to derive the $v_0$ and $v_1$ for the current PU.

BRIEF SUMMARY OF THE INVENTION

A method and apparatus of Inter prediction for video coding using history-based candidate derivation are disclosed, where a history-based candidate list is updated during encoding or decoding. According to one method of the present invention, input data related to a current block in a current picture are received at a video encoder side or a video bitstream corresponding to compressed data including the current block in the current picture is received at a video decoder side, where the current block is inside a Shared Merge candidate list Region (SMR) or a parallel processing region. The current block is encoded or decoded using a Merge candidate list. Only if the current block is one of first-coded N blocks, one of last-coded N blocks, or one of selected N blocks in the SMR or the history-based parallel processing region, the history-based candidate list is updated after the current block is encoded or decoded. N is an integer greater than or equal to 0.

In one embodiment, the N is equal to 0. In this case, the history-based candidate list is always restricted from updating after the current block is encoded or decoded. Alternatively, the history-based candidate list is restricted from updating after the current block is encoded or decoded except when the current block is a last block in the SMR or the history-based parallel processing region.

In one embodiment, the N is determined based on block shape, block width or block height of a shared boundary CU (coding unit) containing the current block.

In one embodiment, the N is a pre-defined value. The pre-defined value can be signalled in a sequence, picture, or slice level in the video encoder side or the pre-defined value can be parsed in the sequence, picture, or slice level in the video decoder side.

In one embodiment, the Merge candidate list is pre-generated for the current block in the SMR and is separately generated for the current block in the history-based parallel processing region.

According to another method, a root CU (Coding Unit) is determined for a Shared Merge candidate list Region (SMR) or a history-based parallel processing region. Input data related to a current block in a current picture are received at a video encoder side or a video bitstream corresponding to compressed data including the current block in the current picture is received at a video decoder side. If the current block is inside the SMR or the history-based parallel processing region, the current block is encoded or decoded using a history-based candidate list associated with the root CU. N is an integer greater than or equal to 0.

If the current block is inside the SMR or the parallel processing region, the history-based candidate list is restricted from updating after the current block is encoded or decoded. If the current block is not inside the SMR or the history-based parallel processing region, the root history-based candidate list is updated after the current block is encoded or decoded.

BRIEF DESCRIPTION OF THE DRAWINGS

FIG. 12A-FIG. 12C illustrates examples of shared Merge list for sub-CUs within a root CU.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

In the present invention, some techniques to simplify sub-block Merge mode are disclosed.

Proposed Method—Shared Candidate List

To simplify the codec operation complexity, a method of shared candidate list is proposed. Here, the "candidate list" means Merge mode or AMVP mode candidate, or other type of prediction candidate list (such as DMVR or bi-lateral refinement candidate list, affine Merge mode, sub-block Merge mode, affine Inter/AMVP mode). The basic idea of "Shared candidate list" is that, the candidate list on a bigger boundary (e.g. a parent CU, or one root of a sub-tree in QTBT or QTBTTT Tree, or one node of QT tree) can be generated, and the generated candidate list can be shared by all leaf-CU inside the boundary or inside the sub-tree.

Figure 12C:
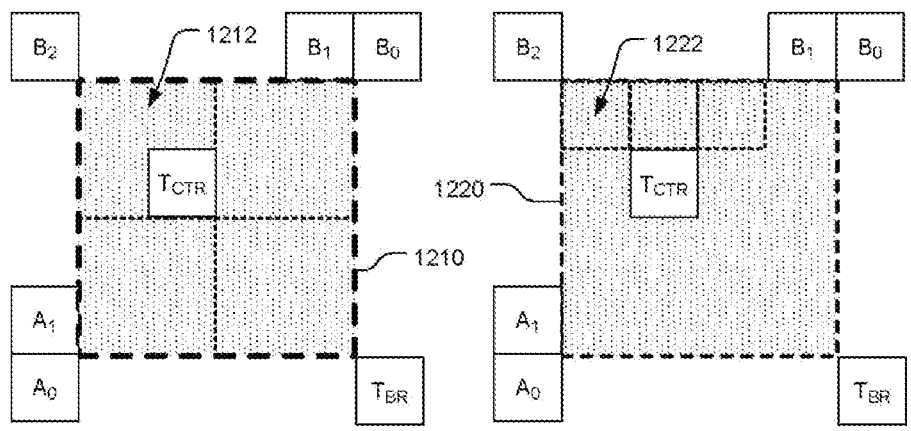
Figure 12C:
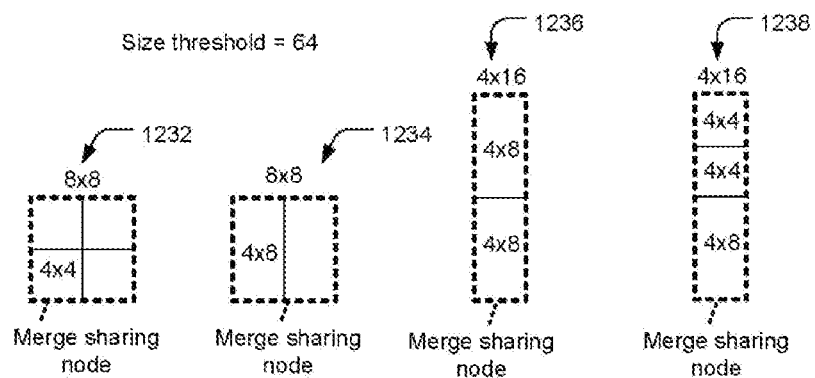

Some examples of shared candidate lists are shown in FIG. 12A to FIG. 12C. In FIG. 12A, the root CU (1210) of sub-tree is shown by the large dashed box. A split leaf CU (1212) is shown as a smaller dashed box. The dashed box 1210 associated with the root CU also corresponds to a shared boundary for leaf CUs under the root leaf. In FIG. 12B, the shared boundary (1220) is shown by the large dashed box. A small leaf CU (1222) is shown as a smaller dashed box. FIG. 12C shows four examples of Merge sharing nodes. The shared merging candidate list is generated for the dotted virtual CU (i.e., Merge sharing node). In partition 1232, the Merge sharing node corresponding to an 8×8 block is split into 4 4×4 blocks. In partition 1234, the Merge sharing node corresponding to an 8×8 block is split into 2 4×8 blocks. In partition 1236, the Merge sharing node corresponding to a 4×16 block is split into 2 4×8 blocks. In partition 1238, the Merge sharing node corresponding to a 4×16 block is split into 2 4×4 blocks and 1 8×8 block.

There are two main embodiments about "shared candidate list": one is to share the candidate list inside a sub-tree, and another one is to share the candidate list inside a "common shared boundary".

Embodiment—Shared Candidate List Inside One Sub-Tree

Figure 1:
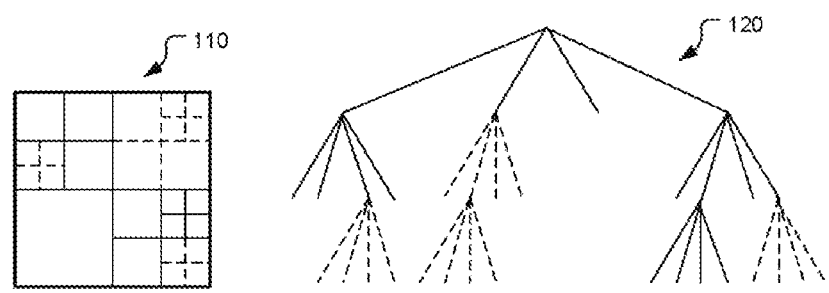
FIG. 1 illustrates an example of block partition using quadtree structure to partition a coding tree unit (CTU) into coding units (CUs).
Figure 2:
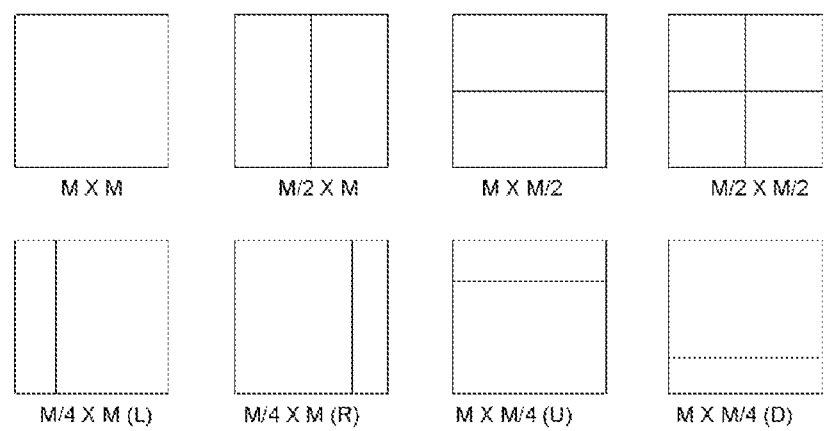
FIG. 2 illustrates asymmetric motion partition (AMP) according to High Efficiency Video Coding (HEVC), where the AMP defines eight shapes for splitting a CU into PU.
Figure 3:
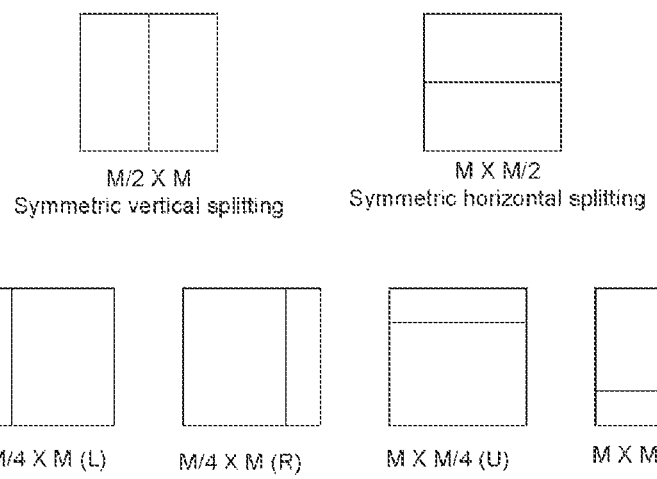
FIG. 3 illustrates an example of various binary splitting types used by a binary tree partitioning structure, where a block can be recursively split into two smaller blocks using the splitting types.
Figure 4:
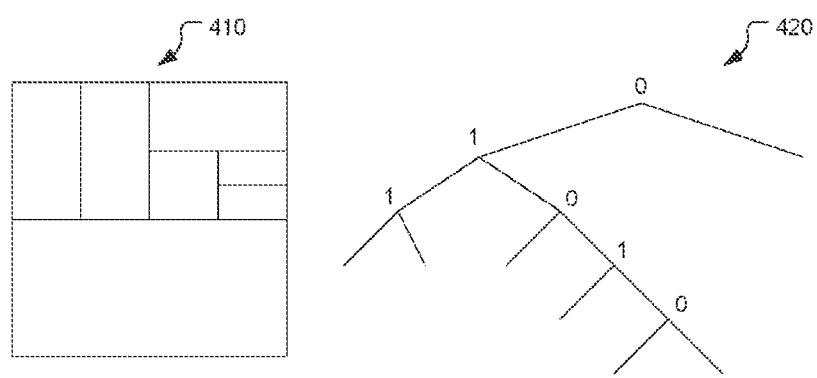
FIG. 4 illustrates an example of block partitioning and its corresponding binary tree, where in each splitting node (i.e., non-leaf node) of the binary tree, one syntax is used to indicate which splitting type (horizontal or vertical) is used, where 0 may indicate horizontal splitting and 1 may indicate vertical splitting.
Figure 5:
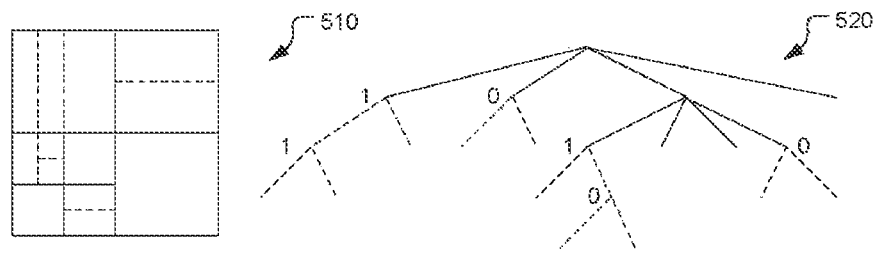
FIG. 5 illustrates an example of block partitioning and its corresponding QTBT, where the solid lines indicate quadtree splitting and dotted lines indicate binary tree splitting.
Figure 6A:
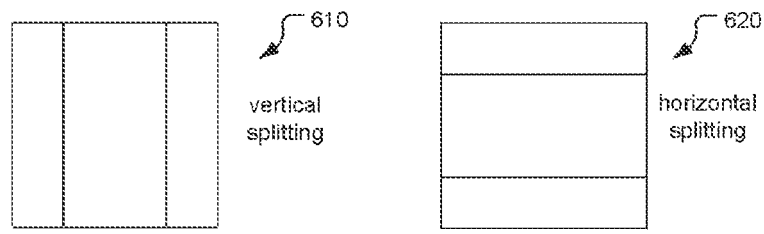
FIG. 6A illustrates vertical triple tree partitioning and horizontal triple tree partitioning.
Figure 6B:
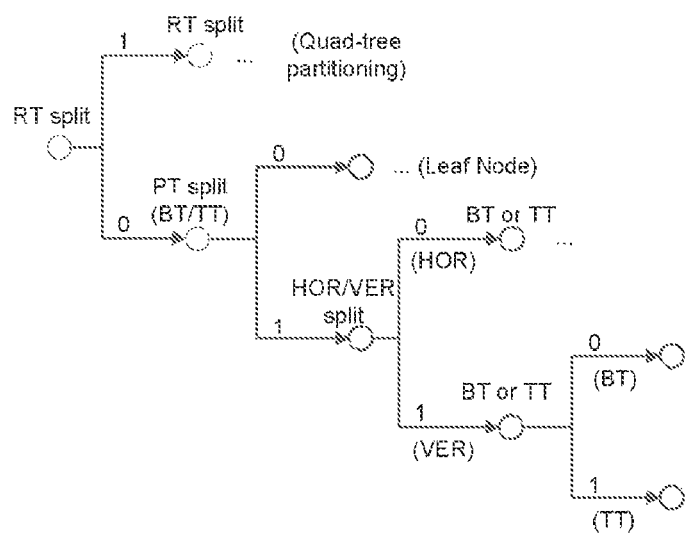
FIG. 6B illustrates an example of tree-type signalling for block partitioning according to MTT block partitioning, where RT signalling may be similar to the quad-tree signalling in QTBT block partitioning.
Figure 13:
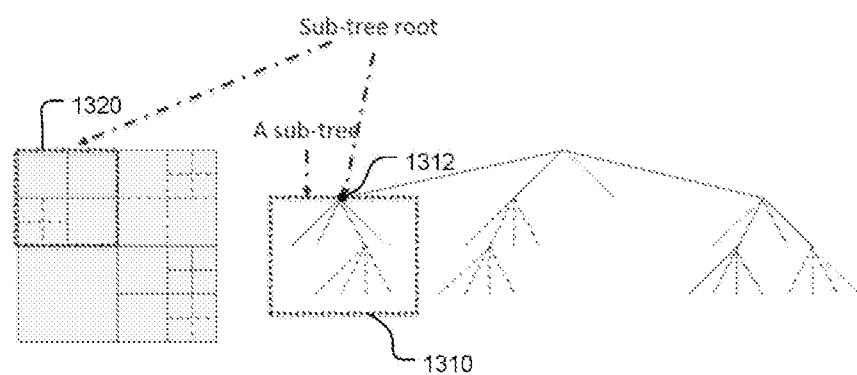
FIG. 13 illustrates an example of sub-tree, where the sub-tree root is a tree node inside the QTBT split tree.

The term "sub-tree" is defined as a sub-tree of QTBT split tree (e.g. the QTBT split tree 120 as shown in FIG. 1). An example of "sub-tree" (1310) is shown in FIG. 13, where the sub-tree root is a tree node (1312) inside the QTBT split tree. The final split leaf CUs of the sub-tree are inside this sub-tree. The block partition 1320 corresponds to the sub-tree 1310 in FIG. 13. In the proposed method, the candidate list (e.g. Merge mode, AMVP mode candidate or other type of prediction candidate list) can be generated based on a shared-block-boundary, where examples of the shared-block-boundary is based on the root CU boundary of sub-tree as shown in FIG. 12A. The candidate list is then re-used for all leaf CUs inside the sub-tree. The common shared candidate list is generated by the root of the sub-tree. In other words, the spatial neighbour position and the temporal neighbouring position are all based on the rectangular boundary (i.e., shared boundary) of the root CU boundary of the sub-tree.

Embodiment—Shared Candidate List Inside One "Common Shared Boundary"

In this embodiment, a "common shared boundary" is defined. One "common shared boundary" is a rectangular area of minimum-block (e.g. 4×4) aligned inside picture. Every CU inside the "common shared boundary" can use a common shared candidate list, where the common shared candidate list is generated based on the "common shared boundary". For example, the sub-blocks within the common shared boundary 1210 can share a Merge candidate list, where one or more Merge candidates are derived based on neighbouring blocks on the common shared boundary. In other words, the spatial neighbour position and the temporal neighbouring position are all based on the "common shared boundary". The common shared boundary can be a square block or a non-square block. The size/depth/width/height of the common shared boundary can be signalled in the sequence-level/picture-level/slice-level.

In the proposed share list methods (e.g. Shared Candidate List inside a Sub-Tree and Common Shared Boundary), the root CU (or said parent CU) or the shared boundary size/depth/shape/width/height is used to derive the candidate list. In candidate list derivation, for any position based derivation (e.g. derive the reference block position according to the current block/CU/PU position/size/depth/shape/width/height), the root CU or the shared boundary position and shape/size/depth/width/height are used. In one embodiment, for affine inherited candidate derivation, the reference block position is first derived. When applying the shared list, the reference block position is derived by using the root CU, or the shared boundary position and shape/size/depth/width/height. In one example, the reference block positions are stored. When coding the child CU in the root CU or the shared boundary, the stored reference block position are used to find the reference block for the affine candidate derivation.

In another embodiment, the control-point MVs of the root CU or the shared boundary of each affine candidates in the candidate list are derived. The control-point MVs of the root CU or the shared boundary of each affine candidates are shared for the child CUs in this root CU or the shared boundary. In one example, the derived control-point MVs can be stored for the child CUs. For each child CU in the root CU or the shared boundary, the control-point MVs of the root CU or the shared boundary are used to derive the control-point MVs of the child CU or are used to derive the sub-block MVs of the child CU. In one example, the sub-block MVs of the child CU is derived from the child CU's control-point MVs, which are derived from the control-point MVs of the root CU or the shared boundary. In one example, the sub-block MVs of the child CU is derived from the control-point MVs of the root CU or the shared boundary. In one example, the MVs of the sub-blocks in the root CU or the shared boundary can be derived at the root CU or the shared boundary. The derived sub-block MVs can be directly used. For the CU in the neighbouring CU outside the root CU or the shared boundary, the control-point MVs derived from the control-point MVs of the root CU or the shared boundary are used to derive the affine inherited candidate. In another example, the control-point MVs of the root CU or the shared boundary are used to derive the affine inherited candidate. In another example, the stored sub-block MVs of a CU are used to derive the affine inherited candidate. In another example, the stored sub-block MVs of the root CU or the shared boundary are used to derive the affine inherited candidate. In one embodiment, for a neighbouring reference CU in the above CTU row, the stored sub-block MVs (e.g. the bottom-left and bottom-right sub-block MVs, or the bottom-left and bottom-centre sub-block MVs, or the bottom-centre and the bottom-right sub-block MVs) of the neighbouring reference CU are used to derive the affine inherited candidate instead of the control-point MVs of the root CU or the shared boundary that contains the neighbouring reference CU, or instead of the control-point MVs of the neighbouring reference CU.

In another embodiment, when coding the child CU, the position and shape/width/height/size of the root CU or the shared boundary can be stored or derived for the affine candidate reference block derivation. The 4-parameter affine model in eq. (3) and 6-parameter affine model in eq. (4) can be used to derive the affine candidate or the control-point MVs of the child CUs. For example, in FIG. 12A, the CU inside the root CU can reference block $A_0$, $A_1$, $B_0$, $B_1$, $B_2$ and collocated block $T_{BR}$ and $T_{CTR}$ to derive the affine candidate. In another embodiment, for affine inherited candidate derivation, the current child CU position and shape/size/depth/width/height are used. If the reference block is inside the root CU or the shared boundary, it is not used for derive the affine candidate.

$$\begin{cases} v_x = \frac{(v_{1x} - v_{0x})}{w}x - \frac{(v_{1y} - v_{0y})}{w}y + v_{0x} \\ v_y = \frac{(v_{1y} - v_{0y})}{w}x + \frac{(v_{1x} - v_{0x})}{w}y + v_{0y} \end{cases} \quad (3)$$

$$\begin{cases} v_x = \frac{(v_{1x} - v_{0x})}{x_1 - x_0}x + \frac{(v_{2x} - v_{0x})}{x_2 - x_0}y + v_{0x} \\ v_y = -\frac{(v_{1y} - v_{0y})}{x_1 - x_0}x + \frac{(v_{2y} - v_{0y})}{y_2 - x_0}y + v_{0y} \end{cases} \quad (4)$$

For the affine corner derived candidate, the corner derived candidates are not used for the child CU according to one embodiment of the present invention. In another embodiment, the current child CU position and shape/size/depth/width/height are used. If the reference block/MV is inside the root CU or the shared boundary, it is not used for deriving the affine candidate. In another embodiment, the shape/size/depth/width/height of the root CU or the shared boundary is used. The corner reference block/MV is derived based on the shape/size/depth/width/height of the root CU or the shared boundary. The derived MVs can be directly used as the control-point MVs. In another embodiment, the corner reference block/MV is derived based on the shape/size/depth/width/height of the root CU or the shared boundary. The reference MV and its position can be used to derive the affine candidate for the child CUs by using the affine model (e.g. 4-parameter affine model or 6-parameter affine model). For example, the derived corner control-point MVs can be treated as the control-point MVs of the root CU or the CU of the shared boundary. The affine candidate for child CU can be derived by using eq. (3) or eq. (4).

The control-point MVs of the constructed affine candidate of the root CU or the shared boundary can be stored. For the child CU in the root CU or the shared boundary, the stored reference block position are used to find the reference block for the affine candidate derivation. In another embodiment, the control-point MVs of the root CU or the shared boundary of each affine candidates in the candidate list are derived.

The control-point MVs of the root CU or the shared boundary of each affine candidates are shared for the child CUs in this root CU or the shared boundary. In one example, the derived control-point MVs can be stored for the child CUs. For each child CU in the root CU or the shared boundary, the control-point MVs of the root CU or the shared boundary are used to derive the control-point MVs of the child CU or are used to derive the sub-block MVs of the child CU. In one example, the sub-block MVs of the child CU is derived from the child CU's control-point MVs, which are derived from the control-point MVs of the root CU or the shared boundary. In one example, the sub-block MVs of the child CU is derived from the control-point MVs of the root CU or the shared boundary. In one example, the MVs of the sub-blocks in the root CU or the shared boundary can be derived at the root CU or the shared boundary. The derived sub-block MVs can be directly used. For the CU in the neighbouring CU outside the root CU or the shared boundary, the control-point MVs derived from the control-point MVs of the root CU or the shared boundary are used to derive the affine inherited candidate. In another example, the control-point MVs of the root CU or the shared boundary are used to derive the affine inherited candidate. In another example, the stored sub-block MVs of a CU are used to derive the affine inherited candidate. In another example, the stored sub-block MVs of the root CU or the shared boundary are used to derive the affine inherited candidate. In one embodiment, for a neighbouring reference CU in the above CTU row, the stored sub-block MVs (e.g. the bottom-left and bottom-right sub-block MVs, or the bottom-left and bottom-centre sub-block MVs, or the bottom-centre and the bottom-right sub-block MVs) of the neighbouring reference CU are used to derive the affine inherited candidate instead of the control points of the root CU or the shared boundary that contains the neighbouring reference CU, or instead of the control-point MVs of the neighbouring reference CU.

In another embodiment, the derived control-point MVs from the root CU and the shared boundary can be used directly without affine model transformation.

In one embodiment, for the temporal collocated MV derivation, the collocated MV of the root CU or the shared boundary is shared/used for all the child CUs. In another embodiment, for the temporal collocated MV derivation, the collocated MV of each CU/block is used instead of the shared temporal collocated MV.

In another embodiment, for the proposed shared list methods (e.g. Shared Candidate List inside a Sub-Tree and Common Shared Boundary), when deriving the reference block position, the current block position/size/depth/shape/width/height are used.

However, if the reference block is inside the root CU or the shared boundary, the reference block position is pushed or moved outside of the root CU or the shared boundary. For example, in FIG. 12A, the block B1 is the above block of the top-right sample of the current block. If the block B1 is inside the root CU or the shared boundary, the position of block B1 is moved above to the first nearest block out side of the root CU or the shared boundary. In another embodiment, when deriving the reference block position, the current block position/size/depth/shape/width/height are used. However, if the reference block is inside the root CU or the shared boundary, the reference block/MV is not used (or treated as unavailable). In another embodiment, when deriving the reference block position, the current block position/size/depth/shape/width/height are used. However, if the reference block is inside the root CU or the shared boundary, or the CU/PU contains reference block is inside the root CU or the shared boundary, or part of the CU/PU that contains reference block is inside the root CU or the shared boundary, the reference block/MV is not used (or treated as unavailable).

In the proposed method, the size/depth/shape/area/width/height of the root CU or the shared boundary can be predefined or signalled in sequence/picture/slice/tile/CTU-row level or a predefined area (e.g. CTU or CTU row). The share of the root CU or the shared boundary can be square or non-square. The size/depth/shape/area/width/height of the root CU or the shared boundary can be predefined and dependent on the input picture size/depth/width/height.

In one embodiment, if the current CU is larger than or equal to the defined area/size/shape/area/width/height and one of the child partition or all of the child partition or part of the child partition is smaller than the area/size/shape/area/width/height, the current CU is designated as a root CU. In another embodiment, if the current CU is smaller than or equal to the defined area/size/shape/area/width/height and the parent is larger than the defined area/size/shape/area/width/height, the current CU is designated as a root CU. Similarly, if the depth of the current CU is smaller than or equal to the defined depth and the depth of one of child partition or all of the child partition or part of the child partition is larger than the defined depth, the current CU is designated as a root CU. For example, if the defined area is 1024 and a CU size is 64×32 (width=64 and height=32), and the vertical TT split is used (e.g. a 64×32 CU partitioned into a 16×32 sub-CU, a 32×32 sub-CU, and a 16×32 sub-CU), the 64×32 block is designated as a root CU. The child CU in this 64×32 use the shared list. In another embodiment, the 64×32 cannot be a root CU, but the 16×32 sub-CU, the 32×32 sub-CU, and the 16×32 sub-CU can be a root CU. In another embodiment, for a defined root CU or shared boundary area/size/depth/shape/area/width/height, the root CU or the shared boundary area/size/depth/shape/area/width/height can be different in different TT partition during the TT split. For example, for the first and the third partitions, the threshold of the root CU or the shared boundary area/size/depth/shape/area/width/height can be divided by 2. For the second partition, the threshold of the root CU or the shared boundary area/size/depth/shape/area/width/height remains the same.

In one embodiment, the root CU or the shared boundary is defined for the QT partition or the QT split CU. If the leaf QT CU is equal to or large than the defined area/size/QT-depth/shape/area/width/height, the root CU or the shared boundary is defined as the leaf QT CU area/size/QT-depth/shape/area/width/height. All the sub-CUs (e.g. partitioned by BT or TT) inside the QT leaf CU use the QT leaf CU as root CU or shared boundary. If a QT non-leaf CU is equal to the defined area/size/QT-depth/shape/area/width/height, this QT CU is used as the root CU or shared boundary. All the sub-CUs partitioned by QT, BT, or TT inside the QT CU use the QT CU as a root CU or shared boundary. In one example, the area/size/QT-depth/shape/area/width/height of the root CU or shared boundary is used to derive the reference block position. In another example, the area/size/QT-depth/shape/area/width/height of the current CU is used to derive the reference block position. If the reference block position is inside the root CU or shared boundary, the reference block position is moved to outside of the root CU or shared boundary. In another example, the area/size/QT-depth/shape/area/width/height of the current CU is used to derive the reference block position. If the reference block position is inside the root CU or shared boundary, the reference block is not used.

In the above mentioned depth, the depth can be equal to $(((A*QT\text{-}depth)\!\gg\!C)+((B*MT\text{-}depth)\!\gg\!D)+E)\!\gg\!F+G$ or $(((A*QT\text{-}depth)\!\gg\!C)+((B*BT\text{-}depth)\!\gg\!D)+E)\!\gg\!F+G$, where the A, B, C, D, E, F, G are integers. The MT-depth means TT-depth or BT-depth. For example, depth can be equal to 2*QT-depth+MT-depth or 2*QT-depth+BT-depth or QT-depth+MT-depth or QT-depth+BT-depth.

Besides the shared list method, we also propose the "shared Merge index" and "shared reference index for Merge mode" based on the shared list method. Here we define a term "child CU for sharing". The "child CU for sharing" is any CU in a sub-tree or in a "common shared boundary" for the candidate list sharing. For example, if the candidate list sharing is the sub-tree based method, the "child CU for sharing" is all CUs inside the sub-tree. For example, if the candidate list sharing is the "common shared boundary" method, the "child CU for sharing" is all CUs inside the "common shared boundary".

The "shared Merge index" and "shared reference index for Merge mode" based on the shared list method are introduced as follow.

For the "shared Merge index" method, not only the Merge candidate list is the same for all child CUs for sharing, but also the final selected Merge index is the same for all child CUs for sharing.

For the "shared reference index for Merge mode" method, not only the Merge candidate list is the same for all child CUs for sharing, but also the Merge index representing a selected candidate having the reference index is the same for all child CUs for sharing.

Share Merge List MV for the Merge/Inter/Affine-Merge/Affine-Inter/ATMVP/Sub-Block Candidate List Construction The candidate list generated at the root CU or the shared boundary can be used for the Merge/Inter/Affine-Merge/Affine-Inter/ATMVP/sub-block candidate list construction of the child CUs even when the shared list is not enabled. The candidates of the root CU or the shared boundary can be added into the candidate list of the child CUs. The shape/size/depth/width/height of the root CU or the shared boundary can be predefined, signalled (e.g. in sequence/picture/slice/tile/CTU-row/CTU-level), or derived. For example, the root CU can be the parent N-level CU and N can be an integer.

In one embodiment, two thresholds can be defined, one is larger and one is smaller. A larger root CU or a larger shared boundary is defined/determined by the larger threshold. A candidate list is generated at the larger root CU or the larger shared boundary. For all the child CUs in the larger root CU or the larger shared boundary, the candidates of the larger root CU or the larger shared boundary can be added into the candidate list of the child CUs. A smaller root CU or a smaller shared boundary is defined/determined by the smaller threshold. A candidate list is generated at the smaller root CU or the smaller shared boundary. When the candidate list of the smaller root CU or the smaller shared boundary is generated, the candidates of the larger root CU or the larger shared boundary can be added. For the child CUs in the smaller root CU or the smaller shared boundary, the candidate list generated at the smaller root CU or the smaller shared boundary is used.

Sub-CU Merge Candidate Handling in the Shared Candidate List

Some methods to achieve shared list for sub-CU candidate (e.g. ATMVP or STMVP or Affine Merge in Merge mode, and Affine AMVP candidate) are disclosed. For the sub-CU candidate, several embodiments for the Shared candidate list are disclosed.

One method is to turn off the sub-CU candidate in the Shared candidate list. Another method is to build the sub-CU candidate on the root CU (or built on shared-block-boundary). For each "child CU for sharing", it directly retrieves the (corresponding area of) sub-CU motion information from the sub-CU candidate. Take a shared boundary corresponding to 16×8 and ATMVP as example. The ATMVP can be generated on the shared boundary corresponding to 16×8 as the conventional ATMVP method. When sharing this candidate list for two child CUs (e.g. 8×8 blocks) inside the common boundary (e.g. 16×8), to make the ATMVP candidate generated for a 16×8 block suitable for an 8×8 block, it can directly retrieve left 8×8 motion information of the 16×8 ATMVP to form the new 8×8 ATMVP for left 8×8 child CU. It can directly retrieve the right 8×8 motion information of the 16×8 ATMVP to form the new 8×8 ATMVP for the right 8×8 child CU.

In another embodiment, the initial MV of the ATMVP, which is used to derive the collocated MV reference block in ATMVP, is derived by using the size/depth/shape/area/width/height of the root CU or the shared boundary. The initial MV of the ATMVP of the root CU or the shared boundary can be shared for the child CUs. The shared initial MV can be used to derive the collocated MV reference block of the child CUs, and then derive the block MV or sub-block MVs of the child CUs.

The proposed "shared candidate list", "shared Merge index" and other shared-attribute methods can be applied to other type of Merge list construction method, such as "History based merge mode construction", and "Non-adjacent merge candidate". In other words, the shared-attribute method is generally applicable to all Merge mode algorithms and AMVP mode algorithms.

Moreover, we further propose to signal a flag to switch on or off for the proposed sharing method. In one embodiment, a flag may be signalled to indicate whether the "shared candidate list" is enabled. The minimum size of units for the signalling can also be separately coded in sequence level, picture level, slice level, or PU level.

In one embodiment, when deriving the initial vector for ATMVP, if the referenced neighbouring MV is inside the root CU or shared boundary, it is not used.

Reduced Candidate List for Small CU

Figure 7:
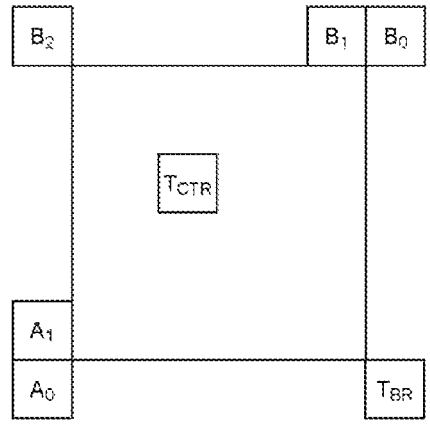
FIG. 7 shows the neighbouring PUs used to derive the spatial and temporal MVPs for both AMVP and Merge scheme.
Figure 8:
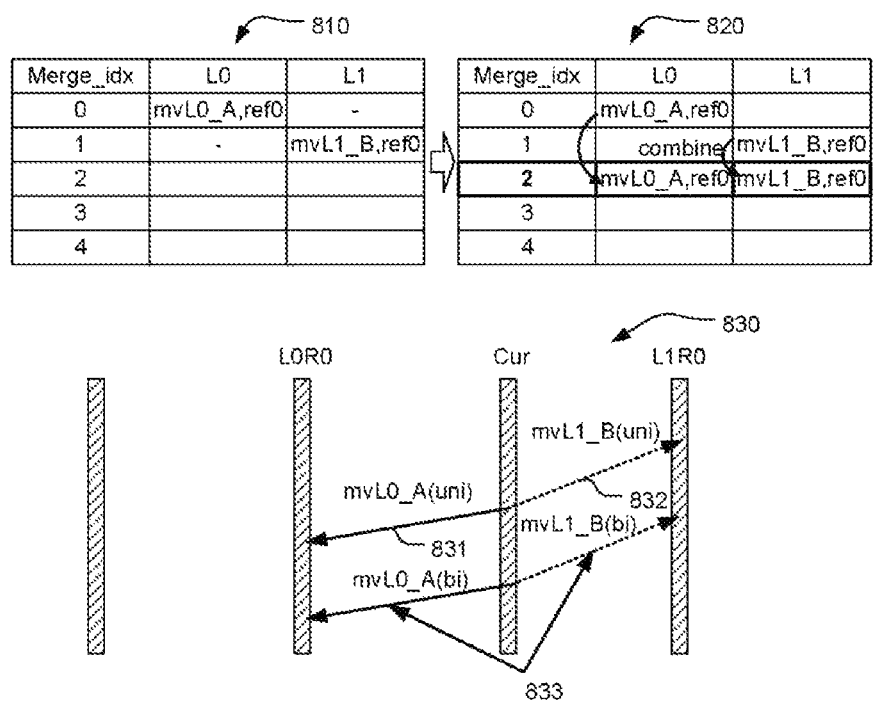
FIG. 8 illustrates an example of the derivation process for combined bi-predictive Merge candidate.
Figure 9A:
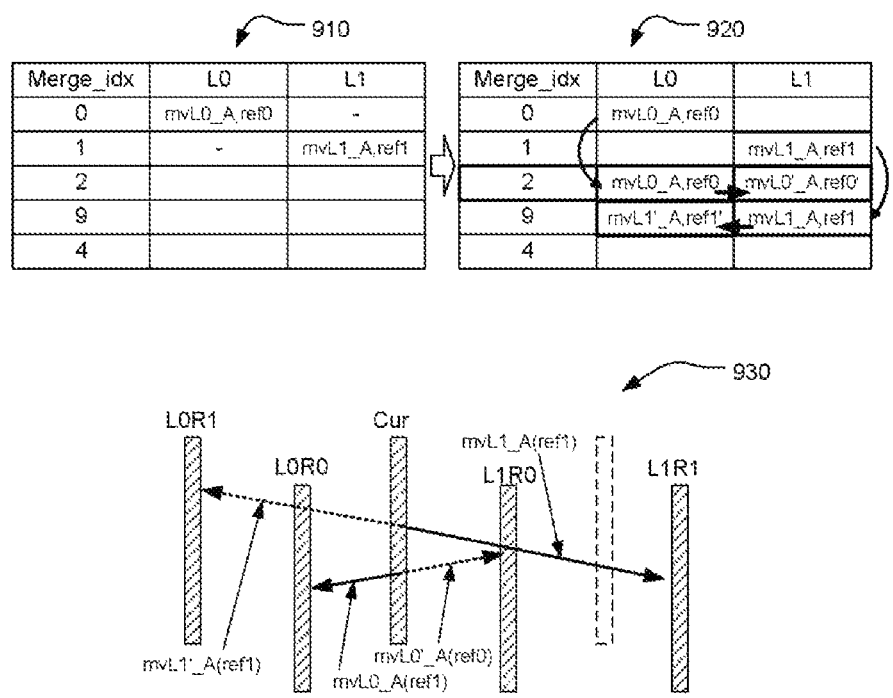
FIG. 9A illustrates an example of the derivation process of the scaled bi-predictive Merge candidate, where candidate list on the left corresponds to an original candidate list and the candidate list on the right corresponds to the expanded candidate list including two generated bi-prediction MVPs.
Figures 9B, 9C, 10:
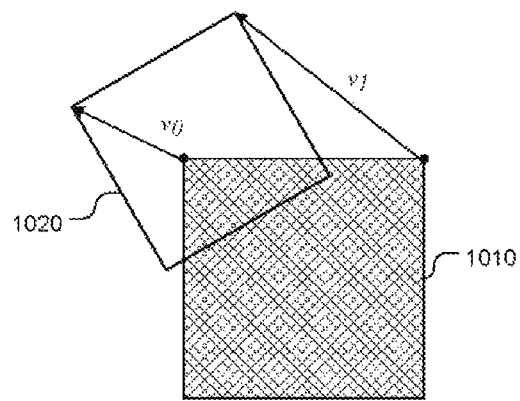
FIG. 9B illustrates an example of adding zero vector Merge candidates, where the candidate list on the left corresponds to an original Merge candidate list and the candidate list on the right corresponds to the extended Merge candidate list by adding zero candidates.
FIG. 9C illustrates an example for adding zero vector AMVP candidates, where the candidate lists on the top correspond to original AMVP candidate lists (L0 on the left and L1 on the right) and the candidate lists at the bottom correspond to the extended AMVP candidate lists (L0 on the left and L1 on the right) by adding zero candidates.
FIG. 10 illustrates an example of four-parameter affine model, where a current block a reference block are shown.
Figure 11A:
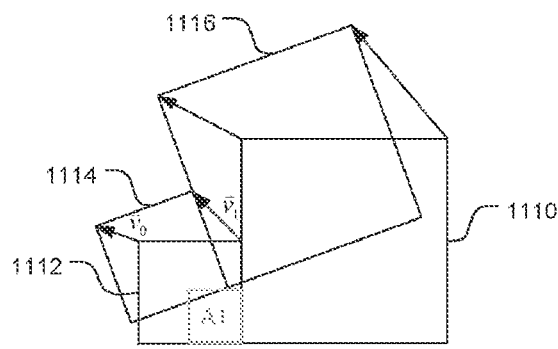
FIG. 11A illustrates an example of inherited affine candidate derivation, where the current block inherits the affine model of a neighbouring block by inheriting the control-point MVs of the neighbouring block as the control-point MVs of the current block.
Figure 11B:
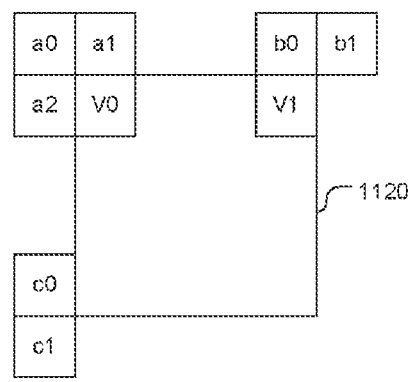
FIG. 11B illustrates the neighbouring block set used for deriving the corner-derived affine candidate, where one MV is derived from each neighbouring group.

In the proposed method, it removes some candidates according to the CU size. If a CU size is smaller than a pre-defined threshold (e.g. area=16), some candidates are removed from the construction of the candidate list. Some embodiments are illustrated by removing some candidates shown in FIG. 7.

a) Removing A1, B1, TCTR
b) Removing A0, B0
c) Removing ATMVP
d) Removing TCTR, TBR or cancelling MV scaling for TCTR, TBR The proposed method is not limited to the listed embodiments. Other combinations of candidates can also be removed according to the present invention.

Simplified Pruning Under Small CU

Conventionally, the pruning of the Merge/AMVP mode has 2 types, first type is full pruning, and second type is pair-wise pruning.

In this embodiment, it uses pair-wise pruning for small CU (i.e., CU size smaller than a threshold), but uses full-pruning for other CU. For pair-wise pruning, each candidate is compared with its previous candidate, instead of compared to all candidates.

In another embodiment, some candidates inside the candidate list use pair-wise pruning, and some other candidates inside the candidate list use full-pruning. This method can have a CU size constraint. For example, if the CU size smaller or larger than a threshold, this mode is enabled. Otherwise, full-pruning or pair-pruning is used for all candidates. In another embodiment, this method can be applied to all CU sizes.

In another embodiment, some candidates inside the candidate list use pair-wise pruning; some candidates inside the candidate list use full-pruning; and some other candidates inside the candidate list use partial-pruning. For partial-pruning, a target candidate is not compared to all candidates, instead, the target candidate is only compared to previous candidates. This method can have a CU size constraint. For example, if the CU size is smaller (or larger) than a threshold, this mode is enabled. Otherwise, full-pruning or pair-pruning is used for all candidates. In another embodiment, this method can be applied to all CU sizes.

In one embodiment, the pruning depends on whether the reference CUs/PUs belong to a same CU/PU. If the two reference blocks belong to the same CU/PU, the latter one is defined as redundant. In one example, one predefined position is used for the pruning process. For example, the top-left sample position of the CU/PU is used for pruning. For two reference blocks, if the top-left sample positions are the same, there are in the same CU/PU. The latter candidate is redundant.

Turning Off Sub-CU Merge Mode Under Small CU

In this embodiment, it turns off sub-CU merge mode (e.g. ATMVP or STMVP or Affine merge) under a small CU (i.e., CU smaller than a threshold).

In the sub-block Merge list, more than one ATMVP candidate can be inserted. For example, two ATMVP candidates can be inserted. In one embodiment, the two ATMVP candidates are inserted in front of the sub-block Merge list. In another embodiment, one ATMVP candidate is inserted in front of the sub-block Merge list, and the other one is inserted after one or more other type of sub-block candidates (e.g. affine candidate). In one example, the ATMVP is inserted at the third, fourth or fifth position of the sub-block Merge list. In another example, the ATMVP is inserted after certain affine candidate in the sub-block Merge list, such as after some affine inherited candidate or before the affine constructed candidates. In another embodiment, both ATMVP candidates are inserted after one or more other type of sub-block candidates (e.g. affine candidate).

MER for QTMTT Structure

In one embodiment, the concept of the Merge estimation region (MER) in HEVC can be extended to the QTBT or the QTBTTT structure. The MER can be non-square. The MER can be in a different shape or size depending on the structure partition. The size/area/width/height can be predefined or signalled in the sequence/picture/slice-level. For the width/height of the MER, the log 2 value of the width/height can be signalled. For the area/size of the MER, the log 2 value of the size/area can be signalled. When a MER is defined for a region, the CU/PU in this MER cannot be used as the reference CU/PU for the Merge mode candidate derivation. For example, the MVs or the affine parameters of the CU/PU in this MER cannot be referenced by the CU/PU in the same MER for the Merge candidate or affine Merge candidate derivation. Those MVs and/or affine parameters are treated as unavailable for the CU/PU in the same MER. For sub-block mode (e.g. ATMVP mode) derivation, the size/depth/shape/area/width/height of the current CU can be used. If the reference CU is in the same MER, the MV information of the reference CU cannot be used.

One of the intended applications for the MER concept is parallel processing since the coding process for the blocks within the MER will not interfere with each other. In this disclosure, the term, "parallel processing region" is used as a more general term than the MER.

When a MER area/size/depth/shape/area/width/height is defined (e.g. predefined or signalled), if the current CU is larger than or equal to the defined area/size/shape/area/width/height and one of the child partitions, all of the child partitions or part of the child partitions are smaller than the area/size/shape/area/width/height, the current CU is designated as one MER. In another example, if the depth of the current CU is smaller than or equal to the defined depth and the depth of one of child partition or all of the child partition or part of the child partition is larger than the defined depth, the current CU is designated as one MER. In another embodiment, if the current CU is smaller than or equal to the defined area/size/shape/area/width/height and the parent CU is larger than the defined area/size/shape/area/width/height, the current CU is designated as one MER. In another example, if the depth of the current CU is larger than or equal to the defined depth and the parent is smaller than the defined depth, the current CU is designated as one MER. For example, if the defined area is 1024 and a CU size is 64×32 (i.e., width=64 and height=32), and the vertical TT split is used (i.e., the 64×32 CU partitioned into a 16×32 sub-CU, a 32×32 sub-CU, and a 16×32 sub-CU), the 64×32 is the MER according to one embodiment of the present invention. The child CUs in this 64×32 MER use the share list. In another embodiment, the 64×32 region is not an MER. However, the 16×32 sub-CU, the 32×32 sub-CU, and the 16×32 sub-CU are designated as MERs. In another embodiment, for a defined MER area/size/depth/shape/area/width/height, the MER area/size/depth/shape/area/width/height can be different in different TT partition during the TT split. For example, for the first and the third partitions, the threshold of MER area/size/depth/shape/area/width/height can be divided by 2 or the depth can be increased by 1. For the second partition, the threshold of MER area/size/depth/shape/area/width/height remains the same.

In one embodiment, the MER is defined for the QT partition or the QT split CU. If the QT CU is equal to or large than the defined area/size/QT-depth/shape/area/width/height, the MER is defined as the leaf QT CU area/size/QT-depth/shape/area/width/height. All the sub-CUs (e.g. partitioned by BT or TT) inside the QT leaf CU use the QT leaf CU as the MER. The MER includes all the sub-CUs in this leaf QT CU. If a QT non-leaf CU is equal to the defined area/size/QT-depth/shape/area/width/height, this QT CU is used as an MER. All the sub-CUs (e.g. partitioned by QT, BT, or TT) inside the QT CU are included in this MER. In one embodiment, the area/size/QT-depth/shape/area/width/height of the MER is used to derive the reference block position. In another embodiment, the area/size/QT-depth/shape/area/width/height of the current CU is used to derive the reference block position. If the reference block position is inside the MER, the reference block position is moved to outside of the MER. In another example, the area/size/QT-depth/shape/area/width/height of the current CU is used to derive the reference block position. If the reference block position is inside the MER, the reference block is not used for the Merge candidate or affine Merge candidate derivation.

In the above mentioned depth, the depth can be equal to $(((A*QT\text{-}depth)\!\!>\!\!>\!\!C)+((B*MT\text{-}depth)\!\!>\!\!>\!\!D)+E)\!\!>\!\!>\!\!F+G$ or $(((A*QT\text{-}depth)\!\!>\!\!>\!\!C)+((B*BT\text{-}depth)\!\!>\!\!>\!\!D)+E)\!\!>\!\!>\!\!F+G$, where the A, B, C, D, E, F, G are integers. For example, depth can be equal to 2*QT-depth+MT-depth or 2*QT-depth+BT-depth or QT-depth+MT-depth or QT-depth+BT-depth.

In another embodiment, the MER region cannot cross the picture boundary. In other words, the MER region must be all inside the picture, no pixels of MER region exist outside the picture boundary.

The MER concept can also be applied to AMVP mode in addition to Merge or affine Merge. The QTMTT-based MER can be applied to all candidate-derivation tools such as AMVP, Merge, affine Merge, etc.

MER and Shared List Both Existing for QTMTT Structure

In this method, both MER and Shared list may both be enabled in the QTMTT structure. In one embodiment, for normal Merge and ATMVP modes, it uses a shared list. But for the affine Merge mode, it uses the QTMTT-based MER. In another embodiment, for some prediction modes, it uses a shared list, but for other Merge mode or AMVP mode, it uses the MER.

Variations of MER and/or Shared List Mode

We propose to apply the Merge estimation region (MER) and/or Shared List Mode with history based MVP mode construction. The History Based Merge Mode stores some motion vectors of previous CU in a history array. In this case, the concept of history-based MER is extended to history-based parallel processing region. For Merge candidates, the current CU can use one or more candidates inside the history array besides the original Merge mode candidates to enrich the Merge mode candidates.

The history based MVP mode construction is a general method of History Based Merge Mode. It is applied to Merge, AMVP, or other Inter prediction mode. If it is applied to merge mode, the algorithm is the same with History Based Merge Mode. The affine candidate (e.g. control points) can also be included in the history list, and each entry of the history list can store a traditional MV or an affine control-point MV set (including k-control points, block starting offset, block width/height corresponding to the affine control point). Some embodiments related to affine candidate in the history list are provided in the following. In one embodiment, only the affine control points of last-coded affine CU are inserted into history list. In another embodiment, the affine control points, block start offset (block_x, block_y), block width, block height of the last-coded affine CU are inserted into the history list. In yet another embodiment, 4 corners of affine control points are inserted into the history buffer. In yet another embodiment, less than 4 corners (e.g. 2 control points or 3 control points) are inserted into the history list, where either a mode is signalled to indicate whether 2 or 3 corners are used or all control points are stored in a 3-corner version.

In Shared List Mode, we generate the candidate list on a predefined node or region (e.g. a parent CU, a root of a sub-tree in QTBT or QTBTTT Tree, a node of QT tree, or other pre-defined rectangular region containing the current CU), and the generated candidate list can be shared for all leaf-CUs inside the boundary or inside the sub-tree. In the MER, a region will be pre-defined, and the CUs in this MER cannot be used as the reference CU for the Merge mode candidate derivation. Therefore, to preserve the concept of Shared List Mode and MER and apply the history based Merge/MVP mode at the same time, several updating constraints and complexity reduction methods are proposed. Moreover, the MER in the following methods is a generalized MER or Merge mode MER. The Merge mode MER is the traditional MER, which works only for Merge mode. The generalized MER can be applied to the AMVP, Merge, or other Inter mode with the same concept of not using neighbouring CU MV as candidate if the neighbouring CU and the current CU are in the same MER region. Moreover, the history method described in a later part of this disclosure also means (1) the generalized history method according to the present invention or (2) original conventional History Based Merge Mode.

Variation 1—Updating Constraints for History Based Merge Mode

In one embodiment, when Shared List mode or MER is enabled, the history based candidates only can be updated after encoding and/or decoding the last leaf-CU inside an MER region or shared region. It cannot be updated when encoding and/or decoding a leaf-CU inside the MER region or shared region because updating will destroy the parallel processing benefit of MER or shared list.

There are several ways for updating history based candidate list. In one embodiment, the history based candidates can be updated with the MVs of the first-coded N CUs, last-coded N CUs or any N CUs inside one MER region or shared region. N can depend on the CU shape, CU width or CU height of the shared boundary CU. Alternatively, N can be a predefined value signalled in the sequence/picture/slice level. For example, the MVs of the last or first N coded CUs (for example, the last or first 3 coded CUs) in a 64×64 MER region or shared region can be used to update the history list.

In another embodiment, two history list buffers are used. One is used to represent a first history list for a MER region or shared region, and it will be used for every leaf-CU in MER region or shared region. The other is used to represent a second history list that will be updated after processing each leaf-CU in MER region or shared region. It will not be used in MER region or shared region. In one embodiment, the second history list can be used for Inter/AMVP mode candidate generation. After encoding and/or decoding the last leaf-CU inside one MER region or shared region, the second history list can be used to update the first history list.

Variation 2—Reusing Merge List as History List

The history based Merge mode stores MVs of some previous CUs in a history array. For the current CU, besides the original Merge mode candidates, it can use one or more candidates inside the history array to enrich the Merge mode candidates.

In one embodiment, it is proposed to use the pre-constructed or previously constructed Merge candidate list directly as history list, so called reused history list. For example, when stopping at a certain parent node, the Merge list can be pre-constructed and stored in the list. For the following child node, the pre-constructed Merge candidates in the history list can be used as the original history based Merge list. In another example, within a binary tree partition, the previously constructed Merge list for the left partition can be used as the history list for the right partition.

In another embodiment, the proposed method can also be applied to the AMVP list using history based mechanism.

In still another embodiment, the proposed reused history list can be used together with the original history list. In other words, any N entries of reused history list can be used to replace the existing entries of original history list at any position with or without pruning.

In still another embodiment, the updating constraints on the MER region or Shared region for the history based Merge mode can also be applied to the proposed reused history list.

Variation 3—Turning Off History Based Merge Mode when Shared List Mode or MER are Enabled In this embodiment, it turns off the history based Merge mode when Shared List mode or MER is enabled. If Shared List mode or MER is enabled, the history based Merge mode will be inferred to be disabled.

Moreover, it further proposes to signal a flag to switch on or off for the MER or shared list mode. In one embodiment, a flag (e.g. "parallelized region") may be signalled to indicate whether MER or shared list mode is enabled (e.g. value 1: enabled, value 0: disabled). The minimum size of unit for signalling spatial_based_pruning_en, can also be separately coded in the sequence level, picture level, slice level or tile level.

Variation 4—Different Updating Number of History Candidates for Different CU Inside MER As mention earlier, when coding leaf CUs inside MER region, the history list to be used must not be changed. In this method, although the history buffer cannot be updated when coding leaf CUs inside an MER region, the number of candidates from the history list to be inserted to leaf CU Merge list can be different for different CUs. For example, if an MER region has 4 leaf CUs, and the history list has 5 candidates. When coding the first CU, it may apply 4 candidates of the history list and insert into the Merge list of the first CU. When coding the second CU, it may apply 3 candidates of the history list and insert into the Merge list of the second CU, and so on. In other words, it depends on the coding order of CU inside MER region to decide the number of history entries to insert into the Merge list of current CU. There are some sub-embodiments. In one sub-embodiment, it inserts more history entries into the Merge list for earlier coded CUs in the MER region and less history entries into the Merge list for later coded CUs. In another embodiment, it inserts less history entries into Merge list for earlier coded CUs in the MER region and more history entries into the Merge list for later coded CUs.

Variation 5—Disabling History Buffer Pruning

In this embodiment, if N last-coded MVs inside an MER region or shared region need to be updated into the history buffer for a next CU when the current MER region or the shared region is finished for coding, the MV pruning of the history list of N last-coded MVs can be disabled to enable the parallel processing.

Variation 6—History with Average Pair

The MV in the history FIFO can be used to average with another candidate that is already in the list or will be checked in the candidate generation process, or another MV. For example, the temporal collocated MV can be used for the average with the history-based candidates. If the reference indices are the same, the MV of history-based candidate and another MV (e.g. a temporal MV) are used for a weighted average to generate a new candidate. In one embodiment, if the reference indices are not the same, the scaling is applied. The other MV is scaled to the reference picture of history-based candidate. In another embodiment, the history-based candidate is scaled to the other MV candidate. In another embodiment, both MVs are scaled to a predefined, derived, or signalled reference index/picture. In another embodiment, the direct weighted average is used. The reference index/picture of the history-based candidate or the other candidate is used. In another embodiment, it just picks the history-based or just picks the other candidate. In another embodiment, if the reference indices are different, no candidate is added.

Variation 7—Square MER and Share List, and CU Splitting Constraint

It is proposed to always use a square region for MER and/or share list root CU or shared boundary.

It is proposed that when the square MER or square share list root CU or shared boundary is applied, the CU splitting constraint is applied. In one example, when doing the CU partition, the sub-CUs should cover one or multiple complete MERs or share list regions. In another example, the sub-CUs should be within one MER region or share list region.

In another embodiment, the CU boundary cannot cross the MER boundary or share list region boundary. The CU can cover one or multiple complete MERs or share list regions.

In another embodiment, a CU cannot cover/contain/include the pixels in two different MER regions or share list regions if the CU does not cover/contain/include those MER regions or share list regions completely.

Variation 8—MER, Using Root History List and Keeping Updating Inside the Root Region When the MER is enabled, the root CU is defined. When a CU is a root CU, the history motion candidate list is stored and/or can be used to generate the candidate list (e.g. normal Merge mode, sub-block Merge mode, affine Merge mode, and/or triangular Merge mode; or normal Inter/AMVP mode and/or affine Inter/AMVP mode). For a current CU inside the root CU, the root history list is used. In one embodiment, a second history list is used. The initial second history list is copied from the first/original history list. When a current CU is inside the root CU, the motion information is updated in the second history list. The second history list data cannot be used in the candidate list generation. After coding all the CUs in the root CU, the first/original history is replaced by the second history list, or the first/original history is copied from the second history list. In another embodiment, when a CU is a root CU, the data of the original history list is stored in a buffer. When a current CU is inside the root CU, the stored history list data is used to generate the candidate list. The original history list keeps update the data when the current CU is inside the root CU. However, the updated data cannot be used for generating the candidate list. Only the stored data can be used. After coding all the CUs in the root CU, the original history can be used again. For the spatial neighbouring CUs inside the root CU, the information (including the motion information, affine control point MVs/parameters, and/or the side information, e.g. prediction modes and types) cannot be accessed or is treated as unavailable.

In one embodiment, if the current leaf CU size and position are the same as the root CU, the current leaf CU is not defined as inside the root CU. In another embodiment, if the current leaf CU size and position are the same as the root CU, the current leaf CU is also defined as inside the root CU.

Variation 9—MER, Using Root History List and Only Updating the Last CU Data in the Root Region When the MER is enabled, the root CU is defined. When a CU is a root CU, the history-based motion candidate list is stored and/or can be used to generate the candidate list (e.g. normal Merge mode, sub-block Merge mode, affine Merge mode, and/or triangular Merge mode; or normal Inter/AMVP mode and/or affine Inter/AMVP mode). For a current CU inside the root CU, the root history list is used. The history list is not updated inside the root CU, except for the last CU in the root CU. After coding the last CU in the root CU, the data of the last CU can be updated in the history list. The updated history list can be referenced by the CUs outside the root CU. For the spatial neighbouring CUs inside the root CU, the information (including the motion information and/or the side information, e.g. prediction modes and types) cannot be accessed or is treated as unavailable.

In one embodiment, if the current leaf CU size and position are the same as the root CU, the current leaf CU is not defined as inside the root CU. In another embodiment, if the current leaf CU size and position are the same as the root CU, the current leaf CU is also defined as inside the root CU.

Variation 10—MER, Using History List and No Updating Inside the Root Region

When the MER is enabled, the root CU is defined. When a CU is a root CU, the history-based motion candidate list is stored and/or can be used to generate the candidate list (e.g. normal Merge mode, sub-block Merge mode, affine Merge mode, and/or triangular Merge mode; or normal Inter/AMVP mode and/or affine Inter/AMVP mode), such that one or more CUs inside the root CU can use the history-based motion candidate list in the following procedure. For a current CU inside the root CU, the history list (or called the history-based motion candidate list), which is pre-generated (or called generated in the previous procedure corresponding to the root CU), is used. In one embodiment, the history updating is disabled (or called the history-based candidate list is restricted from updating) when the coding CU is inside the root CU. The history is only updated when the coding CU is not inside the root CU or the CU size is larger than the MER threshold. For the spatial neighbouring CUs inside the root CU, the information (including the motion information, affine control point MVs/parameters, and/or the side information, e.g. prediction modes and types) cannot be accessed or is treated as unavailable.

In one embodiment, if the current leaf CU size and position are the same as the root CU, the current leaf CU is not defined as inside the root CU. In another embodiment, if the current leaf CU size and position are the same as the root CU, the current leaf CU is also defined as inside the root CU.

Variation 11—MER, No Use History Candidate in MER and No Updating in MER

When the MER is enabled, the root CU is defined. When a CU is a root CU, the history-based motion candidate list cannot be used to generate the candidate list (e.g. normal merge mode, sub-block Merge mode, affine Merge mode, and/or triangular Merge mode; or normal Inter/AMVP mode and/or affine Inter/AMVP mode). In one embodiment, the history updating is disabled when the coding CU is inside the root CU. The history is only updated when the coding CU is not inside the root CU or the CU size is larger than the MER threshold. For the spatial neighbouring CUs inside the root CU, the information (including the motion information, affine control point MVs/parameters, and/or the side information, e.g. prediction modes and types) cannot be accessed or is treated as unavailable.

In one embodiment, if the current leaf CU size and position are the same as the root CU, the current leaf CU is not defined as inside the root CU. In another embodiment, if the current leaf CU size and position are the same as the root CU, the current leaf CU is also defined as inside the root CU.

Variation 12—MER, No Using History Candidate in MER and Keeping Updating in MER

When the MER is enabled, the root CU is defined. When a CU is a root CU, the history-based motion candidate list cannot be used to generate the candidate list (e.g. normal merge mode, sub-block Merge mode, affine Merge mode, and/or triangular Merge mode; or normal Inter/AMVP mode and/or affine Inter/AMVP mode). In one embodiment, the history list is still updated when the coding CU is inside the root CU. However, the updated data cannot be used when the coding CU is inside the root CU. The updated data can be used to generate the candidate list for the CUs outside the root CU. For the spatial neighbouring CUs inside the root CU, the information (including the motion information, affine control point MVs/parameters, and/or the side information, e.g. prediction modes and types) cannot be accessed or is treated as unavailable.

In one embodiment, if the current leaf CU size and position are the same as the root CU, the current leaf CU is not defined as inside the root CU. In another embodiment, if the current leaf CU size and position are the same as the root CU, the current leaf CU is also defined as inside the root CU.

In one embodiment, if the neighbouring reference PU/CU/block is inside the same MER as the current PU/CU/block, the neighbouring reference motion information and side information cannot be used. For example, when deriving the initial vector of the ATMVP mode, the MV of the neighbouring blocks are used. When deriving the affine inherited candidate, the control-points MVs or sub-block MVs of the neighbouring CU/PU/block are used. When deriving the affine constructed candidate, the MVs or the sub-block MVs of the neighbouring CU/PU/block are used. If the neighbouring reference PU/CU/block is inside the same MER as the current PU/CU/block, all these information cannot be used.

Variation 13—History-Index-Based Affine Table

In this method a history-index-based table is established and each entry in the table stores a set of affine parameters. The affine parameters of decoded affine-coded CU are used to write history-index-based table and these affine parameters are used to derive history-index-based affine candidate. These history-index-based affine candidate can be added to affine candidate list. Base position and base MV can be utilized to derive MV of each block for merge history-index-based affine candidate, or to derive the CPMVs for an AMVP history-index-based affine candidate.

In one embodiment, affine parameters in history-index-based table are used to derive history-index-based inherited affine candidate.

In another embodiment, affine parameters in history-index-based table are used to derive history-index-based constructed affine candidate.

In another embodiment, affine parameters in history-index-based table are used to derive history-index-based ATMVP candidate.

In another embodiment, affine parameters in history-index-based table are used to derive history-index-based AMVP candidate.

In another embodiment, history-index-based affine candidates are added at the beginning of Merge candidate list.

In another embodiment, history-index-based affine candidates are added after inherited affine Merge candidates.

In another embodiment, history-index-based affine candidates are added after ATMVP candidate.

In another embodiment, history-index-based affine candidates are added after constructed affine Merge candidate.

In another embodiment, history-index-based affine candidates are added at the beginning of affine AMVP candidate.

In another embodiment, history-index-based affine candidates are after affine AMVP candidate.

In another embodiment, history-index-based affine candidates are before default AMVP candidate.

In another embodiment, history-index-based affine candidates are inserted during inherited affine Merge candidate list construction.

In another embodiment, history-index-based affine candidates are inserted during ATMVP candidate list construction.

In another embodiment, history-index-based affine candidates are inserted during constructed affine Merge candidate list construction.

In another embodiment, history-index-based affine candidates are inserted during affine AMVP candidate list construction.

In another embodiment, affine parameters in the table are copied from neighbouring blocks.

In another embodiment, affine parameters in the table are derived from neighbouring blocks via transform.

In another embodiment, affine parameters in the table are derived from neighbouring blocks based on history-index.

In another embodiment, base position is the centre position of neighbouring blocks.

In another embodiment, base position is the corner position of neighbouring blocks.

In another embodiment, base position is the interpolation of points inside neighbouring blocks.

In another embodiment, base position is on the boundary of neighbouring blocks.

In another embodiment, base position is extrapolation of points inside neighbouring blocks.

In another embodiment, base MV is copied from neighbouring blocks.

In another embodiment, base MV is transformed from neighbouring blocks.

In another embodiment, base MV is averaged from neighbouring blocks.

In another embodiment, base MV is scaled from neighbouring blocks.

In one embodiment, a set of affine parameters stored in history-index-based table could be compressed. The compression methods include mantissa plus exponent representation, truncating least significant bits or most significant bits, rounding, and/or right-shift.

In one embodiment, affine parameters are compressed and then stored into history-index-based table. Affine parameters are decompressed after these values are loaded from the history-index-based table. In the above embodiment, affine parameters are compressed and decompressed and then stored into history buffer.

The above proposed methods (e.g. history based Merge candidate with MER or shared list Merge mode) can be applied to Merge-only mode (e.g. normal Merge mode, sub-block Merge mode, affine Merge mode, and/or triangular Merge mode) as well as both Merge mode and Inter mode (AMVP mode, e.g. normal Inter/AMVP mode and/or affine Inter/AMVP mode).

The foregoing proposed method can be implemented in encoders and/or decoders. For example, the proposed method can be implemented in an Inter prediction module of an encoder, and/or an Inter prediction module of a decoder. Alternatively, any of the proposed methods can be implemented as a circuit coupled to the Inter prediction module of the encoder and/or the Inter prediction module of the decoder, so as to provide the information needed by the Inter prediction module.

Figure 14:
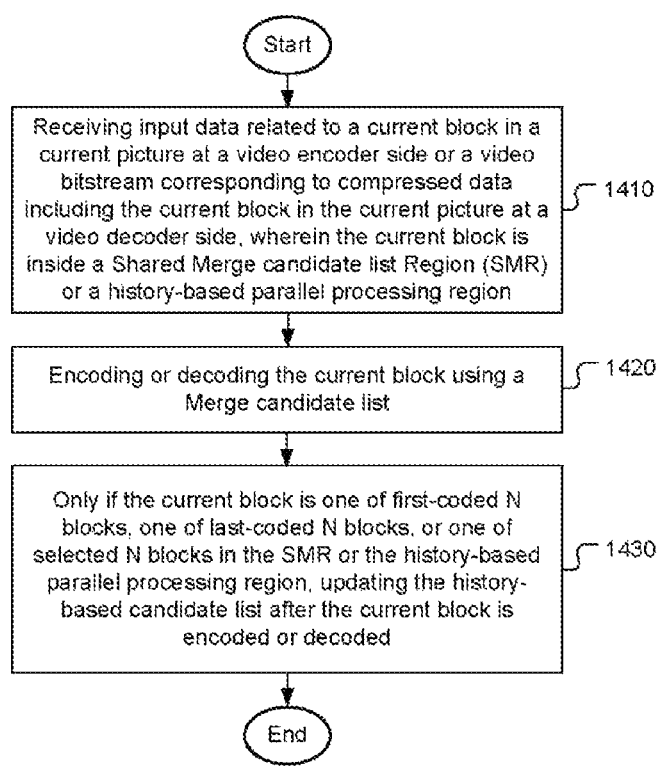
FIG. 14 illustrates a flowchart of an exemplary Inter prediction for video coding using history-based candidate derivation according to an embodiment of the present invention.

FIG. 14 illustrates a flowchart of an exemplary Inter prediction for video coding using history-based candidate derivation according to an embodiment of the present invention. The steps shown in the flowchart, as well as other following flowcharts in this disclosure, may be implemented as program codes executable on one or more processors (e.g., one or more CPUs) at the encoder side and/or the decoder side. The steps shown in the flowchart may also be implemented based hardware such as one or more electronic devices or processors arranged to perform the steps in the flowchart. According to this method, input data related to a current block in a current picture are received at a video encoder side or a video bitstream corresponding to compressed data including the current block in the current picture is received at a video decoder side in step 1410, where the current block is inside a Shared Merge candidate list Region (SMR) or a history-based parallel processing region. The current block is encoded or decoded using a Merge candidate list in step 1420. Only if the current block is one of first-coded N blocks, one of last-coded N blocks, or one of selected N blocks in the SMR or the history-based parallel processing region, the history-based candidate list is updated after the current block is encoded or decoded in step 1430, where N is an integer greater than or equal to 0.

Figure 15:
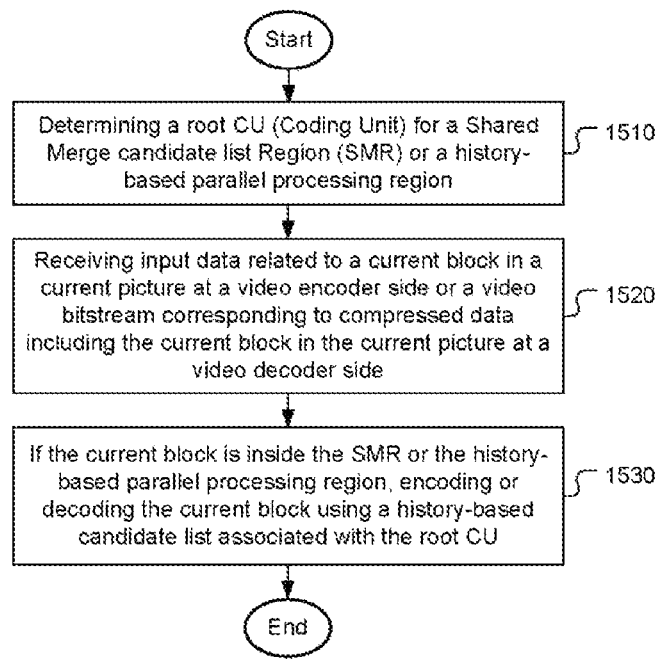
FIG. 15 illustrates another flowchart of an exemplary Inter prediction for video coding using history-based candidate derivation according to an embodiment of the present invention.

FIG. 15 illustrates another flowchart of an exemplary Inter prediction for video coding using history-based candidate derivation according to an embodiment of the present invention. According to this method, a root CU (Coding Unit) is determined for a Shared Merge candidate list Region (SMR) or a history-based parallel processing region in step 1510. Input data related to a current block in a current picture are received at a video encoder side or a video bitstream corresponding to compressed data including the current block in the current picture are received at a video decoder side are received in step 1520. If the current block is inside the SMR or the history-based parallel processing region, the current block is encoded or decoded using a history-based candidate list associated with the root CU in step 1530.

The flowcharts shown are intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

Motion Buffer Compression

The motion vectors are stored using a 6-bit mantissa and a 4-bit exponent to further reduce the storage requirement. The mantissa plus exponent representation effectively quantizes larger motion vector values more coarsely while retaining higher precision for smaller motion vectors, and here the mantissa and exponent are set to −32 and 15 respectively when a temporal motion vector displacement is not available for motion prediction. For example, when Intra mode is used, all four motion vector displacement direction values are assigned a mantissa of −32 and exponent of 15. Similarly, when only one of the two motion vectors are valid (e.g. inter_pred_idc[ ][ ] is PRED_L0 or PRED_L1), then the motion vector with no valid motion information is assigned a mantissa and exponent of −32 and 15 for both the displacement directions. This approach to indicate availability is applied for temporal motion information that corresponds to current picture referencing as well. Note, this aspect may be achieved non-normatively as well.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video coding using history-based candidate derivation, wherein a history-based candidate list is updated during encoding or decoding, the method comprising:
   receiving input data related to a current block in a current picture at a video encoder side or a video bitstream corresponding to compressed data including the current block in the current picture at a video decoder side, wherein the current block is inside a Shared Merge candidate list Region (SMR) or a history-based parallel processing region;
   encoding or decoding the current block using a Merge candidate list; and
   only if the current block is one of last-coded N blocks in the SMR or the history-based parallel processing region, updating the history-based candidate list after the current block is encoded or decoded, wherein the N is an integer equal to 1, and wherein the history-based candidate list is restricted from updating after the current block is encoded or decoded except when the current block is a last block in the SMR or the history-based parallel processing region.

2. The method of claim 1, wherein the N is a pre-defined value.

3. The method of claim 2, wherein the pre-defined value is signalled in a sequence, picture, or slice level in the video encoder side or the pre-defined value is parsed in the sequence, picture, or slice level in the video decoder side.

4. The method of claim 1, wherein the Merge candidate list is pre-generated for the current block in the SMR and is separately generated for the current block in the history-based parallel processing region.

5. An apparatus of video coding using history-based candidate derivation, wherein a history-based candidate list is updated during encoding or decoding, the apparatus comprising one or more electronic circuits or processors arranged to:
   receive input data related to a current block in a current picture at a video encoder side or a video bitstream corresponding to compressed data including the current block in the current picture at a video decoder side, wherein the current block is inside a Shared Merge candidate list Region (SMR) or a history-based parallel processing region;
   encode or decode the current block using a Merge candidate list; and
   only if the current block is one of last-coded N blocks in the SMR or the history-based parallel processing region, update the history-based candidate list after the current block is encoded or decoded, wherein the N is an integer equal to 1, and wherein the history-based candidate list is restricted from updating after the current block is encoded or decoded except when the current block is a last block in the SMR or the history-based parallel processing region.

6. A method of video coding using history-based candidate derivation, wherein a history-based candidate list is updated during encoding or decoding, the method comprising:
   determining a root CU (Coding Unit) for a Shared Merge candidate list Region (SMR) or a history-based parallel processing region;
   receiving input data related to a current block in a current picture at a video encoder side or a video bitstream corresponding to compressed data including the current block in the current picture at a video decoder side; and
   if the current block is inside the SMR or the history-based parallel processing region, encoding or decoding the current block using the history-based candidate list associated with the root CU.

7. The method of claim 6, wherein if the current block is inside the SMR or the history-based parallel processing region, the history-based candidate list is restricted from updating after the current block is encoded or decoded.

8. The method of claim 6, wherein if the current block is not inside the SMR or the history-based parallel processing region, the history-based candidate list is updated after the current block is encoded or decoded.

9. An apparatus of video coding using history-based candidate derivation, wherein a history-based candidate list is updated during encoding or decoding, the apparatus comprising one or more electronic circuits or processors arranged to:
   determine a root CU (Coding Unit) for a Shared Merge candidate list Region (SMR) or a history-based parallel processing region;

receive input data related to a current block in a current picture at a video encoder side or a video bitstream corresponding to compressed data including the current block in the current picture at a video decoder side; and if the current block is inside the SMR or the history-based parallel processing region, encode or decode the current block using the history-based candidate list associated with the root CU.

\* \* \* \* \*